US012575997B2

(12) United States Patent
Zealand et al.

(10) Patent No.: US 12,575,997 B2
(45) Date of Patent: Mar. 17, 2026

(54) EXOSUIT CONTROL USING MOVEMENT PRIMITIVES FROM EMBEDDINGS OF UNSTRUCTURED MOVEMENTS

(71) Applicant: Skip Innovations, Inc., San Francisco, CA (US)

(72) Inventors: Kathryn Zealand, Stanford, CA (US); Andrew Metzger, Berkley, CA (US); Patrick Franks, Palo Alto, CA (US); Erik Lamers, San Francisco, CA (US)

(73) Assignee: Skip Innovations, Inc., San Francisco, CA (US)

( * ) Notice: Subject to any disclaimer, the term of this patent is extended or adjusted under 35 U.S.C. 154(b) by 0 days.

(21) Appl. No.: 19/175,261

(22) Filed: Apr. 10, 2025

(65) Prior Publication Data

US 2025/0375874 A1    Dec. 11, 2025

Related U.S. Application Data

(60) Provisional application No. 63/657,044, filed on Jun. 6, 2024, provisional application No. 63/657,049, filed
(Continued)

(51) Int. Cl.
*B25J 9/00* (2006.01)
*G06F 111/06* (2020.01)

(52) U.S. Cl.
CPC ... *B25J 9/0006* (2013.01); *G05B 2219/40305* (2013.01); *G06F 2111/06* (2020.01)

(58) Field of Classification Search
CPC ...... B25J 9/0006; B25J 9/1692; B25J 9/1045; G05B 2219/40305; G05B 19/4155; A61H 3/00; A61H 2201/5007; G06N 20/00
See application file for complete search history.

(56) References Cited

U.S. PATENT DOCUMENTS 3,327,197 A     6/1967   Marquis
2004/0222712 A1   11/2004   Hong et al.
(Continued)

FOREIGN PATENT DOCUMENTS

CN      118017721 A     5/2024

OTHER PUBLICATIONS

Extremum Seeking Control for Model-Free Auto-Tuning of Powered Prosthetic Legs, Kumar et al., Published on IEEE: Aug. 7, 2019, Retrieved from internet Jun. 2025, URL: https://ieeexplore.ieee.org/document/8790970 (Year: 2019).*
(Continued)

*Primary Examiner* — Jason Holloway
*Assistant Examiner* — Benjamin J Brosh
(74) *Attorney, Agent, or Firm* — Mughal Gaudry & Franklin PC

(57) ABSTRACT

Techniques are provided to personalize an exosuit controller for a wearer. By one or more computing devices, an input is received from the wearer, where the input corresponds to a degree of assistance set by the wearer. A set of non-dominated solutions of a multi-objective optimization model corresponding to the exosuit controller is accessed, where the set of non-dominated solutions represents a pareto front of the multi-objective optimization model. One or more parameters of the exosuit controller are modified based on the degree of assistance set by the wearer, wherein the one or more parameters are modified by selecting a non-dominated solution of the set of non-dominated solutions representing the pareto front.

18 Claims, 20 Drawing Sheets

Related U.S. Application Data on Jun. 6, 2024, provisional application No. 63/657,043, filed on Jun. 6, 2024, provisional application No. 63/657,046, filed on Jun. 6, 2024.

(56) References Cited

U.S. PATENT DOCUMENTS

| | | | |
|---|---|---|---|
| 2009/0112207 A1 | 4/2009 | Walker et al. | |
| 2011/0309699 A1 | 12/2011 | Woolmer et al. | |
| 2012/0169154 A1 | 7/2012 | Curodeau | |
| 2012/0212085 A1 | 8/2012 | Fu et al. | |
| 2014/0012164 A1* | 1/2014 | Tanaka | B25J 9/0006 |
| | | | 601/35 |
| 2014/0191624 A1 | 7/2014 | Jahshan | |
| 2015/0127118 A1* | 5/2015 | Herr | A61F 2/60 |
| | | | 623/24 |
| 2015/0209214 A1 | 7/2015 | Herr et al. | |
| 2017/0222494 A1 | 8/2017 | Hunstable | |
| 2018/0104075 A1 | 4/2018 | Mooney et al. | |
| 2018/0177618 A1* | 6/2018 | Langlois | A61F 2/80 |
| 2018/0360347 A1* | 12/2018 | Lim | A61B 5/1116 |
| 2019/0142681 A1* | 5/2019 | Seo | A61H 3/00 |
| | | | 601/5 |
| 2019/0159954 A1* | 5/2019 | Ozsecen | B25J 9/0006 |
| 2019/0160321 A1* | 5/2019 | Ozsecen | A63B 24/0087 |
| 2019/0374161 A1* | 12/2019 | Ly | A61F 2/68 |
| 2020/0100976 A1* | 4/2020 | Asbeck | A61F 5/01 |
| 2020/0274431 A1 | 8/2020 | Abbott et al. | |
| 2020/0276698 A1* | 9/2020 | Ding | B25J 9/163 |
| 2021/0007874 A1* | 1/2021 | Galiana Bujanda | A61F 5/028 |
| 2021/0085553 A1* | 3/2021 | Lim | A61H 3/00 |
| 2021/0110734 A1* | 4/2021 | May | A61B 5/486 |
| 2021/0218321 A1 | 7/2021 | Cunnygham et al. | |
| 2022/0099112 A1 | 3/2022 | Noda et al. | |
| 2022/0362094 A1* | 11/2022 | De Rossi | A61H 3/00 |
| 2023/0387735 A1 | 11/2023 | Keum et al. | |
| 2024/0189980 A1* | 6/2024 | Fey | B25J 9/1694 |
| 2024/0285420 A1* | 8/2024 | Lim | A61H 3/00 |
| 2024/0324902 A1* | 10/2024 | Matijevich | A61B 5/6801 |
| 2025/0032340 A1* | 1/2025 | Yang | A61H 1/0244 |
| 2025/0138501 A1* | 5/2025 | Baughman | A61H 3/00 |

OTHER PUBLICATIONS

Assistive Exoskeleton Control with User-Tuned Multi-Objective Optimization, Stewart et al., Published on IEEE: Jul. 29, 2019, Retrieved from internet Jun. 2025, URL: https://ieeexplore.ieee.org/document/8779386 (Year: 2019).*
International Search Report and Written Opinion for PCT Application No. PCT/US2025/024020, dated Aug. 1, 2025.
Office Action for U.S. Appl. No. 19/175,257, dated Jun. 11, 2025.

* cited by examiner

100-A

102  Battery
126  Memory
124  Microprocessor
104  Control Electronics
106a  Accelerometer/IMU
122a  Right Hinge
105  Actuator
108  Force Sensor
106b  Accelerometer/IMU
Flex Sensor 112

116a
114a
118a
114b
118b
114c
118c
116b
118d
114d 215a
220a
225a
230
225b
220b
215b

200-B

700

800

805

810

1100

Receive sensor data from one or more sensors in a powered exosuit — 1105

Generate a vector embedding in real-time by processing the received sensor data using a deep learning model — 1110

Assign a cluster to the vector embedding based on a similarity model — 1115

Trigger a control program of the powered exosuit based on the assigned cluster — 1120

1200

Receive an input from a wearer of an exosuit to personalize an exosuit controller ⌐1205

Access a set of non-dominated solutions of a multi-objective optimization model corresponding to the exosuit controller ⌐1210

Modifying one or more parameters of the exosuit controller based on the input by selecting a non-dominated solution ⌐1215

1300-B

EXOSUIT CONTROL USING MOVEMENT PRIMITIVES FROM EMBEDDINGS OF UNSTRUCTURED MOVEMENTS

CROSS REFERENCE TO RELATED APPLICATIONS

This application claims the benefit of U.S. Provisional Patent Application No. 63/657,043 filed on Jun. 6, 2024, and to U.S. Provisional Patent Application No. 63/657,044 filed on Jun. 6, 2024, and to U.S. Provisional Patent Application No. 63/657,046 filed on Jun. 6, 2024, and to U.S. Provisional Patent Application No. 63/657,049 filed on Jun. 6, 2024. Each of these applications are incorporated by reference herein in its entirety for all purposes.

BACKGROUND

Exoskeletons are wearable devices that are designed to augment human physical capabilities, providing strength, endurance, and mobility enhancements. They typically comprise rigid structures, actuators, sensors, and control systems. Exoskeletons can be categorized into two types: powered and passive. Powered exoskeletons may utilize motors or hydraulic systems to actively assist a wearer or enhance its movements, while passive exoskeletons rely on mechanical structures to provide support and stability without powered assistance. These assistive devices, to enhance human performance and mitigate physical strain, can have applications in various fields such as military, healthcare, industry, and rehabilitation.

However, existing exoskeletons may face several challenges, particularly in movement control and usability. To achieve seamless integration between movements of a wearer and an assistance provided by the exoskeleton is still a major problem. The control systems or algorithms may accurately interpret or predict movements of the wearer in real-time to provide timely and appropriate assistance while ensuring safety. In addition, the exoskeletons may frequently struggle with issues related to their large weight, bulky structures, uncomfortable straps, and energy consumption. These issues can limit the practicality of exoskeletons for prolonged use and their acceptance or compliance from target users. Improving the ergonomics, efficiency, and user experience of the exoskeletons are ongoing areas of research and development to unlock their full potential in various applications.

SUMMARY

Some embodiments of the present disclosure relate to methods and system of a concealed and intelligent exosuit to continuously and dynamically assist mobility of a wearer. The concealed and intelligent exosuit is a powered exosuit in the form of intelligent clothing, for example, a pair of pants. The powered exosuit or exosuit may be comprised of one or more sensors, an exosuit controller, one or more axial flux electric motors, and one or more actuators. The one or more sensors may be configured to measure movement of at least one body part of a wearer of the exosuit. The exosuit controller may be comprised of one or more processors and control circuits. Moreover, the one or more axial flux electric motors may be comprised of a yokeless stator, a first rotor, a second rotor, two back-irons, and a motor assembly.

The yokeless stator may be comprised of a circular array of teeth. Each tooth of the circular array of teeth can be wound with one or more coils of electric wire to generate a magnetic field. The magnetic field is generated when the one or more coils are energized with current. The one or more coils of electric wire may be arranged to make magnetic field direction parallel to an axis of rotation of the axial flux electric motor. The first rotor can be equipped with multiple permanent magnets attached to it. The first rotor is mounted above the yokeless stator and there may be a first air gap in between the first rotor and the yokeless stator. The second rotor can also be equipped with multiple permanent magnets attached to it. The second rotor is mounted below the yokeless stator and there may be a second air gap in between the second rotor and the yokeless stator. In some instances, a height of the first air gap is the same as a height of the second air gap.

Each of the two back-irons may be comprised of a circular steel plate. A first back-iron is present above the first rotor and a second back-iron is present below the second rotor. The two back-irons may cover the multiple permanent magnets of the first rotor and the second rotor. The two back-irons may also provide a return path to magnetic flux caused by the magnetic field of the yokeless stator. The motor assembly may connect the yokeless stator, the first rotor, the second rotor and the two back-irons. The motor assembly may be comprised of thermally conductive epoxy. In some instances, an axial length of the motor assembly may be less than 20 mm. Similarly, a cycloid transmission can be connected to the motor assembly.

In some embodiments, the yokeless stator may be comprised of soft magnetic composite (SMC) material such as Somaloy 1000 3P material. The one or more coils of electric wire of the yokeless stator may include multiple coils of electric wire configured in series connection. According to some instances, a resistance of each coil of the one or more coils can be less than 0.06 Ohms. Moreover, a wire fill factor of the yokeless stator can be greater than 85%. A magnetic flux of the axial flux electric motor may be parallel to the axis of rotation. A magnetic circuit mass of the axial flux electric motor may be less than 150 grams, and a torque constant of the motor can be greater than 0.1 NM/A. The cycloid transmission may be connected substantially middle of the motor assembly.

According to some aspects of the present disclosure, the one or more actuators may be comprised of a brushless motor, a cycloid transmission, a torque sensor, a PCB, and one or more encoders. The brushless motor may be comprised of an input shaft, a stator, and one or more rotors with multiple permanent magnets mounted on them. In some instances, the brushless motor may be the axial flux electric motor. In some other instances, the brushless motor can be a radial flux motor.

The cycloid transmission may be comprised of two cycloidal disks. The cycloid transmission can be nestled inside the brushless motor. The two cycloidal disks may be connected to the input shaft through an eccentrically mounted bearing. In some instances, the gear ratio of the cycloid transmission can be configured to 22:1 to support torque-speed characteristics of human movement. Moreover, the cycloid transmission may be connected substantially middle of the brushless motor to make a pan-cake shape flat actuator.

The torque sensor may be connected with the cycloid transmission. In some embodiments, the torque sensor may be comprised of 4 dual-grid shear strain gauges that are mounted at 4 locations on a grounded side of the cycloid transmission. The 4 dual-grid shear strain gauges may be connected in a bridge structure. The bridge structure can be a Wheatstone bridge.

In some embodiments, the one or more encoders may be used to encode a position of the one or more rotors of the brushless motor. A magnetic off-axis position may be determined by the one or more encoders. The position can be an absolute position within one mechanical revolution of the brushless motor. The one or more encoders may include a motor encoder and an output encoder. In some other embodiments, the one or more encoders and a signal amplifier for the torque sensor may be placed on the PCB. The one or more encoders can provide an absolute position of a knee joint when the actuator is placed on the knee joint of a knee-powered exosuit. Moreover, the one or more encoders can also provide an incremental position of the two rotors of the brushless motor. The one or more encoders may be mounted on either side of the PCB. The PCB can be connected with a ribbon or flat flex wire passing between the stator and a cycloid ring gear, and then going out of the cycloid transmission to a motor controller PCB.

According to disclosed techniques, the exosuit controller may be configured to generate control signals in real-time for the one or more actuators based on received data of the one or more sensors. The exosuit controller can be configured to identify a support configuration for the wearer of the exosuit based on the received data of the one or more sensors. Moreover, the exosuit controller may control the one or more actuators to dynamically adjust a torque or a force for providing the identified support configuration to the wearer.

A computer-implemented method includes receiving sensor data from the one or more sensors in the powered exosuit. The sensor data may represent the movement of a wearer of the powered exosuit. A vector embedding may be generated in real-time by processing the received sensor data using a deep learning model. The deep learning model may be trained in an unsupervised manner using a dataset that includes past movements of one or more wearers of the powered exosuit. A cluster of a set of clusters may be assigned to the vector embedding based on a similarity model. Each cluster of the set of clusters may represent a movement primitive. The set of clusters can be defined by grouping multiple vector embeddings based on the similarity model. The multiple vector embeddings are generated by processing the dataset using the deep learning model. A control program of the powered exosuit may be triggered based on the assigned cluster or the movement primitive. The control program may adjust dynamically at least the torque or the force of the one or more actuators of the powered exosuit to provide assistance to the wearer. Moreover, each cluster may correspond to a different control program of the powered exosuit.

In some embodiments, the deep learning model may be an encoder network that is configured to transform the sensor data into the vector embedding. The encoder network was trained with a decoder network configured to reconstruct the sensor data based on the vector embedding. For the similarity model, a gaussian mixture model (GMM) can be used. The gaussian mixture model may assign the vector embedding to the cluster of the set of clusters with a probability value. In some instances, the similarity model can be a k-Means clustering technique. The disclosed technique further includes updating one or more control programs of the powered exosuit corresponding to one or more movement primitives may include on-device testing with human-in-the-loop method.

The sensor data of the one or more sensors may include an acceleration of an upper leg, an acceleration of a lower leg, an angular velocity of the upper leg, and an angular velocity of the lower leg. The dataset may be comprised of both structured movements and unstructured movements of the one or more wearers of the powered exosuit. The structured movements include at least one of: walking, running, standing, sitting, stair ascent, stair descent, or inclined walking.

In some embodiments, a second set of the sensor data may be received from the one or more sensors in the powered exosuit. A second vector embedding may be generated in real-time by processing the second set of the sensor data using the deep learning model. Another cluster of the set of clusters may be assigned to the second vector embedding based on the similarity model. A second control program of the powered exosuit may be identified based on the assigned another cluster. Based on the assigned another cluster, determine whether the wearer of the powered exosuit has transitioned from one movement primitive to another movement primitive. Based on the determination of transition between movement primitives, modify the control signals generated by the second control program of the powered exosuit by using filters to provide smooth control of the powered exosuit during transitions.

In some other embodiments, a computer-implemented method is disclosed to personalize the exosuit controller for the wearer. An input from the wearer may be received by using one or more computing devices. The input may correspond to a degree of assistance set by the wearer. Access a set of non-dominated solutions of a multi-objective optimization model corresponding to the exosuit controller. The set of non-dominated solutions may represent a pareto front of the multi-objective optimization model. One or more parameters of the exosuit controller may be modified based on the degree of assistance set by the wearer. The one or more parameters are modified by selecting a non-dominated solution from the set of non-dominated solutions representing the pareto front.

In some instances, the input is generated by the wearer through a simple interface including a single input dial or an up-down button. While in some other instances, the input is generated by the wearer through a voice command to the exosuit controller. In addition, the input from the wearer is 1-D input indicating the degree of assistance: low, medium, or high. The multi-objective optimization model may comprise two metrics that include a comfort level and a metabolic cost reduction. Accordingly, the pareto front may be defined by using the multi-objective optimization model along the two metrics: the comfort level and the metabolic cost reduction. Hence, the input corresponding to a low degree of assistance may configure the exosuit controller to provide a high comfort level and a low metabolic cost reduction. The exosuit controller may be configured to provide assistance to the wearer by dynamically adjusting a stiffness value for impedance control and a torque value by controlling at least the one or more actuators.

In some embodiments, the pareto front may be determined by maximizing the multi-objective optimization model along a first objective function and a second objective function based on the human-in-the-loop method. The maximization of the multi-objective optimization model may include changing the one or more parameters of the exosuit controller. The first objective function may correspond to the metabolic cost reduction of the wearer and the second objective function may correspond to the comfort level of the wearer. The comfort level of the wearer may be identified through feedback of the wearer. Moreover, the metabolic cost reduction may be determined by using a trained machine learning model with the one or more sensor data of the powered exosuit. In addition, there can be a tradeoff between the first objective function and the second objective function.

In some other embodiments, the exosuit controller can be automatically adapted for the wearer. The disclosed technique includes receiving a first set of sensor data of the one or more sensors in the powered exosuit by using the one or more computing devices. The first set of sensor data may capture a first movement of the wearer during a first time interval. A first set of features may be determined by the one or more computing devices. The first set of features may represent the first movement of the wearer based on the first set of sensor data. Similarly, receiving a second set of sensor data of the one or more sensors in the powered exosuit by using the one or more computing devices. The second set of sensor data may capture a second movement of the wearer during a second time interval. A second set of features may be determined by the one or more computing devices. The second set of features may represent the second movement of the wearer based on the second set of sensor data. To detect a change in one or more features by comparing the first set of features with the second set of features. Lastly, the exosuit controller may be adjusted to vary the degree of assistance to the wearer by the powered exosuit upon detecting that the change in the one or more features exceed a threshold value.

In some embodiments, adjusting the exosuit controller comprises accessing a set of non-dominated solutions of the multi-objective optimization model corresponding to the exosuit controller. The set of non-dominated solutions may represent a pareto front of the multi-objective optimization model. One or more parameters of the exosuit controller may be modified based on the degree of assistance. The one or more parameters may be modified by selecting a non-dominated solution of the set of non-dominated solutions representing the pareto front.

In some instances, the updated value of the degree of assistance may be determined based on a magnitude and a sign of the change in the one or more features that exceed the threshold value. The first set of features and the second set of features may include at least one of: a gait speed, a stride height, a stride length, an estimated calories burnt, or an estimated fatigue. Moreover, the first set of sensor data and the second set of sensor data may include at least one of: an acceleration of an upper leg, an acceleration of a lower leg, an angular velocity of the upper leg, and an angular velocity of the lower leg. The one or more sensors in the powered exosuit may include a motion sensor, an accelerometer, and a gyroscope.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

DETAILED DESCRIPTION

Figure 1A:
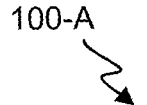
FIG. 1A shows a side view of an example implementation of the concealed and intelligent exosuit.
Figure 1A:
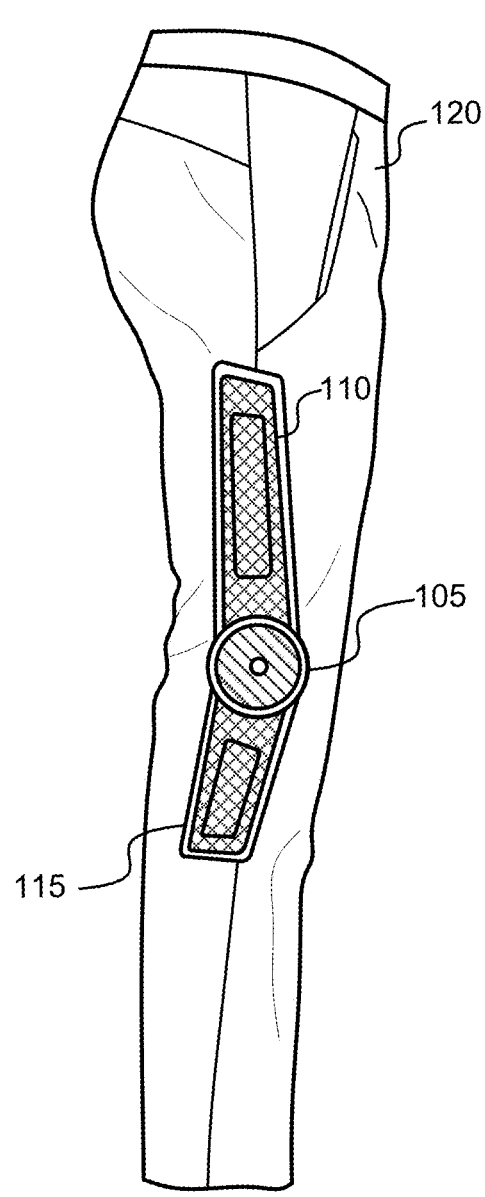

Intelligent clothing can improve mobility of users with a variety of movement limitations. Presently available devices that provide mobility support to users may include orthotics such as braces for the upper limbs, lower limbs, or spine. The orthotics can generally provide support for a single type of movement, and do not have variable stiffnesses or structure. The users who need support for a single joint or a limb may be forced to use different braces for different types of activities. These braces are rigid, heavy, and uncomfortable, and are usually conspicuous. In many cases, assistive devices that provide movement support to the user are available for highly specialized purposes, including military support and devices for users with severe loss of musculoskeletal function etc. These devices are not suitable for different types of user to be used in daily life. Moreover, traditional devices are either not personalized or the device behavior cannot be changed easily according to user preferences or movement limitations.

Some embodiments of the present disclosure relate to methods and system of a concealed and intelligent exosuit to dynamically assist mobility of a wearer. More specifically, the exosuit is a powered exosuit in the form of intelligent clothing, for example, pants. The powered exosuit may comprise sensors, actuators, and a control system. The disclosed powered exosuit focuses on easy to wear and easy to use design by building the straps or rigid structures into a pair of pants, minimizing overall weight, and a personalized control with continuous movement support. According to some embodiments, a technical solution is provided in the present disclosure to a technical problem of design and development of a light weight, comfortable, suitable for prolonged use in everyday life, and with an efficient personalized continuous movement support.

According to some aspects of the present disclosure, a customized motor can be designed for a knee-powered exosuit to reduce the size and weight of actuators and simultaneously achieve specific torque-speed characteristics of human movement. By making the heaviest component of the knee-powered exosuit (i.e., actuators) light weight, easy to wear design, and along with efficient control may lead to better compliance and acceptance from elderly people. The actuator may be designed based on an axial flux permanent magnet motor (AFPM) having dual-rotors and a yokeless stator. The yokeless stator comprises of a circular array of stator teeth that may be wound with one or more coils of copper windings. The AFPM motor may have two rotors with circumferentially affixed permanent magnets, mounted above and below the yokeless stator with an air gap. The permanent magnets of the two rotors may be covered with back-irons. The back-iron comprises of a circular steel plate and may provide a return path to magnetic flux caused by the magnetic field of the yokeless stator. The copper windings can be arranged such that a magnetic field generated by a current flowing in the coils is aligned on an axis parallel to a rotational axis of the AFPM motor. In this way, the magnetic field from one coil can apply torque to two magnets simultaneously. A motor assembly may be used to connect the yokeless stator, the dual-rotors and the back-irons.

The AFPM motor with the yokeless stator may have a smaller stator core weight and iron losses, shorter end-windings, and a higher winding fill factor, which may facilitate achieving a higher torque density and efficiency of the motor. The stator is mechanically and magnetically separated without yoke and that can reduce the cost, volume, weight and unnecessary power loss of the motor. The yokeless stator may comprise soft magnetic composites (SMC) materials such as Somaloy 1000 3p or other new materials to reduce eddy current losses. Soft magnetic composites are ferromagnetic powder particles and may be coated with a uniform layer of electrical insulation. The disclosed motor geometry may achieve better performance than off the shelf brushless motors of similar size in terms of a continuous operating torque, a mass, and a volume.

One exemplary embodiment of the disclosed motor geometry relates to implementation of the (dual-rotor, yokeless stator) AFPM motor with a number of stator coils 24 and a number of rotor poles 28. Both the dual-rotors and the yokeless stator may have an outer diameter of 63 mm and an inner diameter of 43 mm. The total axial length of the motor assembly is 8.5 mm. The coils that belong to same phase of a 3-phase electric supply may be connected in series and a WYE configuration may be used for phase-to-phase connection. The two rotors can have the same air gap of 0.25 mm. The stator may be comprised of Somaloy 1000 3P material. The motor may achieve a wire fill factor of 89.7% with a coil resistance per coil is 0.0265 Ohms. According to the example implementation, the motor may achieve a torque constant (Kt) of 0.132 NM/A and a motor magnetic circuit mass of 107.3 grams. The motor may achieve an efficiency of 92.3% at a maximum operating torque of 1.14 Nm, an output speed of 4200 rpm, and at 20 degree Celsius. The exemplary motor may be 60% smaller in volume, 30% more powerful (based on a motor constant Km), and 10% lighter, when compared to off the shelf commercially available motor of similar-diameter, for example (T-motor AK80).

In some embodiments of the present disclosure, the actuator may comprise a cycloid transmission and the AFPM motor as described above. The cycloid transmission may be packed substantially in the middle of the assembly of the AFPM motor, resulting in a compact pan-cake shaped actuator of small form-factor. The cycloid transmission can be used to reduce the speed of an input shaft by a certain ratio and with a low backlash. The input shaft may be connected with the rotors of the AFPM motor. The cycloid transmission may comprise a cycloidal disc, a ring gear, output rollers or pins connected with an output shaft. The input shaft may drive an eccentric bearing that in turn drives the cycloidal disc in an eccentric, cycloidal motion. The perimeter of the cycloidal disc is geared to the ring gear, which is fixed and may remain stationary. The number of pins on the ring gear is larger than the number of pins on the cycloidal disc. The cycloidal disc may independently rotate around the eccentric bearing as it is pushed against the ring gear. The cycloidal disc has holes that are larger (by an amount equal to the eccentricity of the input shaft) than the output rollers or pins that go inside the holes. The output rollers can directly drive the output shaft as the cycloidal disc rotates. The direction of rotation of the cycloidal disc and the output shaft is opposite to that of the input shaft. The output rollers may move around in the holes to achieve steady rotation of the output shaft from a wobbling movement of the cycloidal disc. A custom gear ratio can be designed for a given torque-speed profile. In some instances, the custom gear ratio can be configured to achieve 22:1 cycloidal speed reduction for the torque-speed profile of human movement.

Further, a torque sensor may be directly attached to the cycloid transmission of the actuator. The torque sensor may comprise 4 dual-grid shear strain gauges that may be mounted at 4 different locations on a grounded side of the cycloid transmission. The 4 dual-grid shear strain gauges may be connected in a bridge structure. The actuator may also include a PCB which comprises of one or more encoders and a signal amplifier for the torque sensor. The one or more encoders may provide an absolute position within one mechanical revolution and/or incremental position of the two rotors of the AFPM motor. The encoders can be mounted on either side of the PCB. The PCB is connected with a ribbon or flat flex wire that may pass between the stator and the ring gear, out of the cycloid transmission to a motor controller PCB.

The existing exoskeletons mainly rely on optimized task-specific controllers (e.g., walking, stairs ascent or descent etc.) and switch between the task-specific controllers based on a classification approach that classifies tasks. The term "task" as used herein may refer to already known movement activities such as walking, upstairs, downstairs, jumping, posture transitions etc. However, in the real world, movement cannot be neatly discretized. Often, it is difficult or impossible to classify movements into discrete activities or tasks. For example, when does a hill go from shallow incline to steep? What if a wearer of the exosuit may change direction mid-step? What is a shuffle? Etc. Furthermore, it is unclear how many discrete activities a control strategy should support. As number of the task-specific controllers or activity controllers increases, the more difficult it may become to achieve good performance for any particular movement. Many controllers (or control laws) may remain redundant. If the activity controllers are too few, then misclassifications of discrete activities to wrong controllers (i.e., controller may not support that activity) may lead to poor controller performance. Another approach to control the powered exosuit is to use task-agnostic controllers which can adapt over changing activities. But the task-agnostic controllers can be difficult to tune to achieve high performance for any activity in particular.

Data-driven approaches to a task-specific control can improve performance and scale better than heuristic approaches alone. Data-driven approaches may identify known tasks accurately, while also effectively handling unknown tasks. One way to simplify the complexity of task-specific control may be to simplify the representation of human movement. Dimensionality reduction or encoding approaches such as PCA or autoencoders can be used to transform movement data into a lower-dimensional latent space representation. The lower-dimensional latent space representation of movement can make activity classification easier and can also improve identification of pathological gait.

According to disclosed techniques, the movement data of the user e.g., inertial measurement unit (IMU) signals can be encoded into embeddings. Similar embeddings may then be grouped into clusters based on a degree of similarity. Each cluster may represent a movement primitive (MP). Many disparate tasks (e.g., stair ascent, shuffling) can be described as a sequence of movement primitives. The term "primitives" may refer to a set of modular and short duration movements that can be used to represent continuous movements corresponding to many disparate tasks. Some of these primitives can be found in many tasks (e.g., level ground walking and stair ascent both feature knee flexion in a swing phase). Some primitives may be specific to certain tasks. A cyclic activity, for example walking can be considered as a periodic sequence of movement primitives.

According to some aspects of the present disclosure, controllers may be designed for movement primitives discovered within the lower-dimensional latent space or an embedding space. Afterwards, these controllers may be used to design generalized controllers that can provide safe and effective assistance, even for unstructured movements (e.g., shuffling). With correct classification of movement primitives, task-specific control can deliver the benefits of expertly tuned control for many activities. Moreover, unknown movements can be categorized into known primitives using machine learning approaches e.g., using a weighted nearest-neighbors. This may facilitate generalizing the controllers as task-agnostic control strategies. In this way large data-driven exoskeleton control models can be developed that leverage recent advances in AI.

To implement controllers for the movement primitives, a dataset covering broad spectrum of structured and unstructured activities or movements may be generated by different individuals wearing the powered exosuit. The dataset comprises of sensor data of the powered exosuit. In some instances, a machine learning model such as an autoencoder may be trained to transform the sensor data using an encoder function to a lower-dimensional embedding space. Clustering technique, for example, a gaussian mixture model (GMM) may be used to define clusters that group similar embeddings together. Each cluster may correspond to a primitive. These primitives may represent discrete, human-interpretable movements (e.g., stance phase of stair ascent) that correspond to states in the task-specific controllers, or the primitives may be novel representations of movement. The GMM model may utilize soft-assignment approach and assign clusters probabilistically. For example, walking up a shallow incline may be a mixture of "level-ground" and "incline" walking. The number of clusters may be adjusted iteratively to prepare the exosuit controller to generalize across movements while keeping effective controllers for known primitives.

A control law (or assistive model or controller) may be assigned to each cluster based on labeled movement data. The labeled movement data may be processed through the encoder function and clustering (the GMM), and the resulting clusters can be compared with the states in the controllers. For example, for the clusters that contain known data from stair ascent states, the corresponding control parameters may be utilized from a previously optimized controller. In this way, gold-standard controls can be retained for known tasks. The unknown activities located nearby in the embedding space may also benefit from similar controls. For example, a single step up on a curb can be automatically clustered with similar movement primitives cycled through during stair ascent, and be assigned appropriate controllers, even though a control law for that task was not explicitly trained. Unlike black-box machine learning (ML) approaches, control laws for clusters can be fine-tuned during on-device testing with human-in-the-loop methods. Moreover, during real-time device (exosuit) assistance, filters may be used to smooth transitions between movement primitives. In addition, by leveraging soft cluster assignments of the GMM model to blend controls, abrupt transitions can further be avoided which are typically present in traditional classification methods.

Different users may have distinct preferences for their device or exosuit behavior, and users may prefer to have some flexibility to directly adjust the device. For example, users often want the controller to be "stronger" for more assistance or "softer" for more comfort. A simple user interface such as a single input dial or an up/down button to adapt device behavior may improve acceptance of the device by the target users. Yet even the simplest exoskeleton controllers usually have multiple parameters that are not intuitive for users to tune. Personalizing exoskeleton controls quickly and intuitively is challenging with traditional controllers. For example, controllers that work across activities are often too complex to be easily tuned. Similarly, current neural network-based controllers create black boxes that fail to put the user in control of their own device.

Some embodiments of the present disclosure relate to providing user-specific fine-tuning of the controller. The user or wearer may provide an input through a simple interface of the powered exosuit or device. The input corresponds to a level of assistance or level of resistance in performing the movements, as set by the user. The simple interface of the device may receive inputs based on gestures, or voice commands. The interface may comprise an up-down button or a rotating dial to set assistance. The controller may implement nonlinear scaling of torque and other parameters based on the input.

To implement fine-tuning of the controller, a multi-objective optimization may be performed along two or more metrics to discover Pareto front. For example, Pareto front can be obtained along two metrics such as comfort level and metabolic cost (or metabolic cost reduction or metabolic benefit). The concept of Pareto front or set of optimal solutions in the space of objective functions in multi-objective optimization problems stands for a set of solutions that are non-dominated to each other but are superior to the rest of solutions in the search space. The controller may be designed in such a way that with a single 1-D input from the user, multiple control parameters can be varied by selecting a different point (or controller) along the Pareto front.

According to some embodiments, for each primitive, an active control law may be defined by 2 control parameters: a stiffness value for impedance control and a torque value. Based on the control parameters, the controller may be optimized for each of the metrics at first. For optimizing comfort level, a preference-based optimization can be performed. For example, by asking the user whether "is this more or less comfortable". For metabolic cost, a human-in-the-loop optimization may be used. In one instance, two-minute estimates of metabolic cost may be computed using a Cosmed K5 system. These estimates may then be used to train a machine learning model, which is configured to estimate metabolic cost based on the sensor data. Afterwards, a constraint-based approach may be used to construct the Pareto front. In the multi-objective optimization, the constraint may be implemented as varying minimum metabolic costs. In some instances, after conducting the multi-objective optimization and obtaining the Pareto front, the performance of the controllers along the Pareto front may be compared for metabolic cost and user-rated comfort. Moreover, it can also be compared with single-objective optimized parameters. Furthermore, the variation in control parameters may be analyzed to infer heuristic approximations.

FIG. 1A shows a side view of an example implementation of the concealed and intelligent exosuit. The exemplary exosuit is implemented in the form of smart pants 120. The exemplary exosuit is a knee-powered exosuit which comprises of the smart pants 120, an upper panel 110, a lower panel 115, and an actuator 105. The upper panel 110 and/or lower panel 115 may comprise the actuator 105 (or motor), electronic circuits (e.g., PCBs, processor, memory, motor drivers etc.), and battery. The upper panel 110 and lower panel 115 may be detachable and can be easily connected to the smart pants 120. The smart pants 120 can be worn easily and may be washable. The griping mechanism or straps may be built inside the smart pants 120.

Figure 1B:
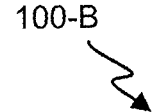
FIG. 1B depicts a back view of the example implementation of the concealed and intelligent exosuit of FIG. 1A.
Figure 1B:
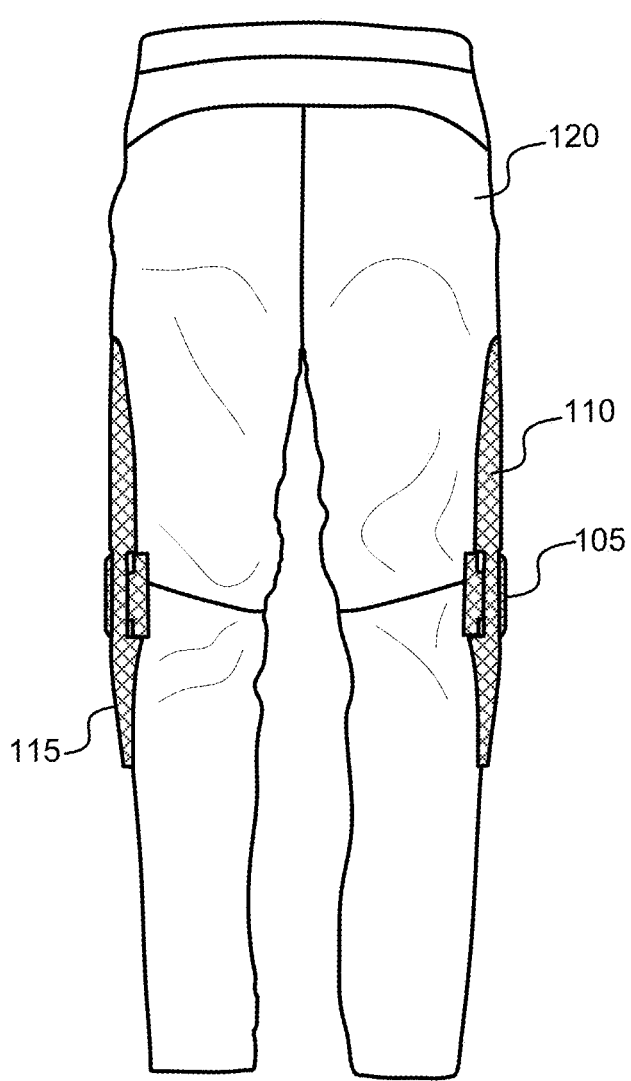

FIG. 1B depicts a back view of the example implementation of the concealed and intelligent exosuit of FIG. 1A. The smart pants 120 looks like ordinary pants with no straps, braces, or heavy metal components outside the smart pants 120 as in traditional exoskeletons.

Figure 1C:
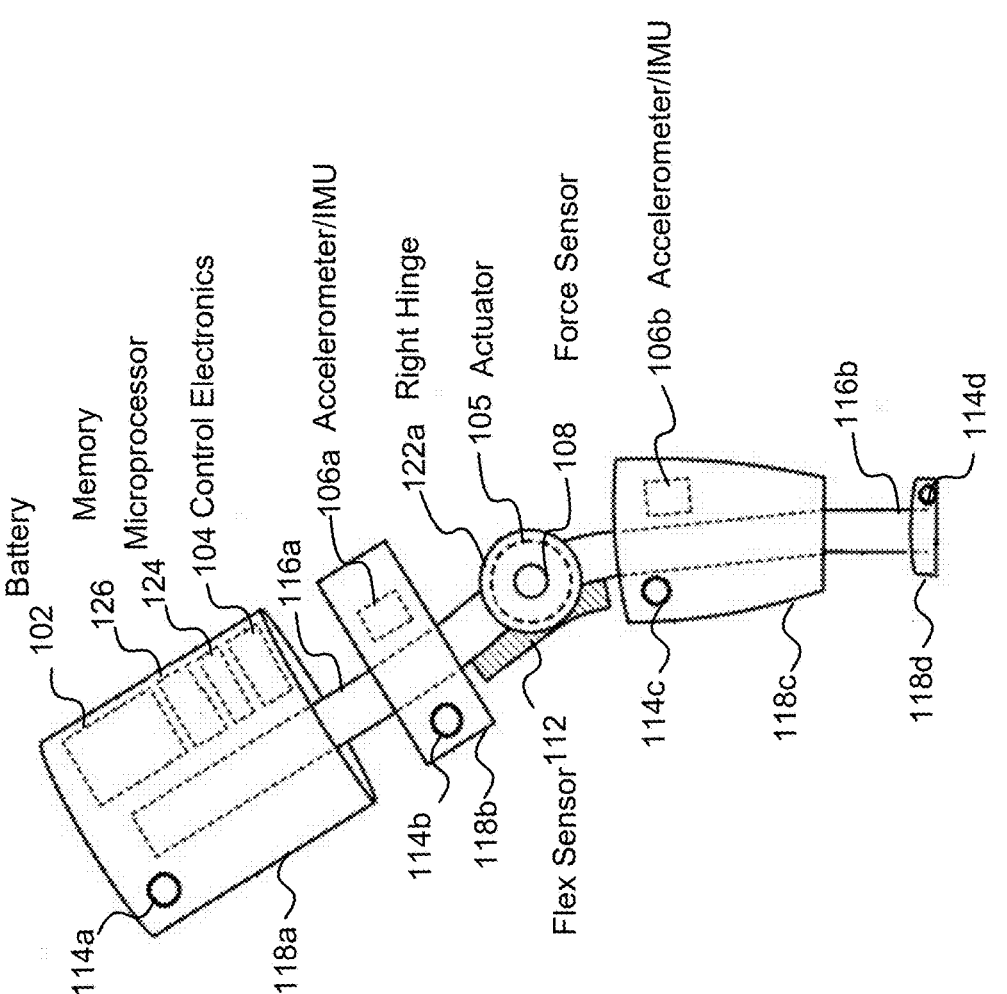
FIG. 1C illustrates exemplary components of an internal structure 100-C of the knee-powered exosuit.

FIG. 1C illustrates exemplary components of an internal structure 100-C of the knee-powered exosuit. The internal structure 100-C can be implemented inside a fabric of the smart pants 120, for example, to hide internal structure 100-C a dual-layer of the fabric can be used. The knee-powered exosuit or powered exosuit may include a control system for detecting different movements, activity transitions and performing actions in response. The powered exosuit can use transition detection to change the behavior of the powered exosuit, for example, better assist a wearer and/or to prevent injury to the wearer.

In some instances, the internal structure 100-C of the powered exosuit can be used externally, for example, as a powered exoskeleton. The powered exosuit can be a mechanically assistive piece of clothing. The powered exosuit may include a number of sensors. These sensors output sensor data. The sensor data can include, for example, an amount of force or torque at a hinge of the exosuit (e.g., that can be indicative of the amount of force or torque at a joint of the wearer), an amount of force or torque at a joint of the wearer, an angle of a hinge of the exosuit (e.g., that can be indicative of an angle of a joint of the wearer), an angle of one or more of the wearer joints, one or more pressures placed on the exosuit or placed on particular portion of the exosuit (e.g., that can be indicative of one or more pressures experienced by the wearer), an acceleration of the exosuit (e.g., that can be indicative of an acceleration experienced by the wearer, a limb of the wearer, or a portion of a limb of the wearer), multiple accelerations of different portions of the exosuit (e.g., that can be indicative of acceleration experienced by different limbs of the wearer, and/or by different portions of a limb of the wearer).

The various components of the powered exosuit can be used to, for example, collect data on the wearer, analyze the collected data to determine one or more assistive actions to perform, and provide assistance to the wearer by performing the assistive actions. This type of monitoring and reactive assistance can provide the wearer a better quality of life by, for example, reducing injuries that the wearer might otherwise experience due to not receiving assistance or not receiving assistance appropriate for current circumstances, e.g., when the wearer is transitioning between activities.

The powered exosuit includes a battery 102. The battery 102 can provide power to various electronic components of the powered exosuit. The battery 102 can be a lithium-ion battery. The battery may be placed in the upper panel 110 and can be detachable.

The powered exosuit also includes a microprocessor 124, memory 126, and control electronics 104. The microprocessor 124 can receive outputs from the one or more sensors of the powered exosuit, such as output from accelerometers/inertial measurement units (IMUs) 106a-106b, a force sensor 108, and/or a flex sensor 112. The microprocessor 124 can use this sensor data to, for example, determine one or more actions to perform. The microprocessor 124 can send instructions to the control electronics 104 to carry out the actions, e.g., the control electronics 104 can translate the instructions into control signals to send to an actuator 105.

To control the exosuit one or more control programs can be run by using the microprocessor 124. One or more control programs may include machine learning (ML) or artificial intelligence (AI) based models. The one or more control programs can indicate one or more actions to perform or can be used by the microprocessor 124 to determine one or more actions to perform. The one or more control programs can be stored in the memory 126 of an onboard data store of the powered exosuit. The microprocessor 124 can access data stored on the data store. In some instances, the ML or AI based models, e.g., for activity or movement detection, can be a part of a remote management system that can communicate with the powered exosuit.

The microprocessor 124 can use the output of the accelerometer/IMU 106a to determine, for example, an acceleration of the wearer upper leg and/or an orientation of the wearer upper leg. Similarly, the microprocessor 124 can use the output of the accelerometer/IMU 106b to determine, for example, an acceleration of the wearer lower leg and/or an orientation of the wearer lower leg. The microprocessor 124 can compare the outputs of the accelerometers/IMUs 106a-106b. The outputs of the accelerometers/IMUs 106a-106b and/or the differences between the outputs can indicate an orientation of the wearer, an activity being performed by the wearer, whether a transition is occurring, and/or the type of transition that is occurring. The microprocessor 124 can use the output of the accelerometers/IMUs 106a-106b and/or the differences between the outputs in determining an orientation of the wearer, an activity being performed by the wearer, whether a transition is occurring, and/or the type of transition that is occurring. For example, if the accelerometer/IMU 106a provides output of 5 m/s$^2$ and an upper leg angle of 100 degrees and if the accelerometer/IMU 106b provides output of less than 1 m/s$^2$ and an angle of 0 degrees, then the microprocessor 124 can determine that the wearer is transitioning from sitting to standing with a high confidence (e.g., confidence over 70%, over 80%, over 90%, or the like). The microprocessor 124 can make this determination using a transition detection model.

The microprocessor 124 can use the flex sensor 112 to determine an angle between the wearer upper leg and lower leg, e.g., the angle of the wearer knee joint. The angle between the wearer upper leg and lower leg, and/or the changes in the angle between the wearer upper leg and lower leg can indicate the activity that the wearer is performing and/or whether a transition is occurring. For example, if the changes in the angles between the wearer upper leg and lower leg are changing periodically or near periodically, and/or if the angles between the wearer upper leg and lower leg are within a particular range of values, then the microprocessor can determine the wearer is currently walking. In making this determination, the microprocessor 124 can determine confidences for each of the activities that the wearer might be performing. For example, the confidence of the wearer walking can be determined to be 75%, the confidence of the wearer running can be 22%, and the confidence of other activities combined can be 3%. The microprocessor 124 can use an activity detection model to make the determination that the wearer is currently walking. The flex sensor 112 can be an electro-goniometer.

In some embodiments, the internal structure 100-C may be extended up to shoes of the wearer and may include one or more pressure sensors as well. The control electronics 104 and/or microprocessor 124 can use the pressure sensors to determine the amount of pressure on the wearer foot. This pressure can indicate or help to indicate an activity that the wearer is currently performing, whether a transition is occurring, and/or a type of transition that is occurring. The microprocessor 124 can use the output of the pressure sensor in determining an activity that the wearer is currently performing, whether a transition is occurring, and/or a type of transition that is occurring. For example, if the output of the pressure sensor indicates that the wearer is placing between 18% and 22% of their body weight on their right foot over the last ten seconds, then the microprocessor 124 can determine that the wearer is currently sitting. In making this determination, the microprocessor 124 can determine confidences for each of the activities that the wearer might be performing. For example, the confidence of the wearer sitting can be determined to be 85%, the confidence of the wearer standing can be 14%, and the confidence of the other activities combined can be 1%. The microprocessor 124 can use the activity detection model to make the determination that the wearer is currently sitting, and/or to determine the confidence of each of the activities.

Similarly, the microprocessor 124 can use this output of the pressure sensor to reduce the confidence of other possible activities that the wearer is performing and/or the types of transitions that can be occurring. For example, this output of the pressure sensor can be used to significantly lower the confidence of the wearer climbing stairs, walking, or running. Moreover, this output of the pressure sensor can be used to significantly lower the confidence of the wearer transitioning from sitting to standing, transitioning from walking to running, transitioning from walking to climbing stairs, or the like.

The structural components of the powered exosuit include, for example, a right-side upper bar 116a, a right side lower bar 116b, a right hinge 122a that the bars 116a-116b are coupled to, a first cuff 118a that corresponds to an upper leg of the wearer, a second cuff 118b that corresponds to the upper leg of the wearer, a third cuff 118c that corresponds to a lower leg of the wearer, and a fourth cuff 118d that corresponds to a foot or ankle of the wearer. The first cuff 118a, the second cuff 118b, the third cuff 118c, and the fourth cuff 118d may have a first knob 114a, a second knob 114b, a third knob 114c, and a fourth knob 114d, respectively. The knobs 114a-d can be used to tighten or fasten the cuffs 118a-d. The powered exosuit can also include a left side upper bar, a left side lower bar, and a left hinge. The bars may be implemented with a lightweight material such as carbon fiber.

The actuator 105 can be used to apply a torque between the right-side upper bar 116a and the right side lower bar 116b. The amount of torque applied by the actuator 105 can be controlled by the control electronics 104 and/or the microprocessor 124. The amount of torque applied by the actuator 105 can correspond to a control program that the control electronics 104 and/or microprocessor 124 is currently running. The control program can correspond to a particular activity, to any transition, and/or to a particular transition. For example, the control program currently being run by the microprocessor 124 can be a control program for walking.

The control electronics 104 and/or the microprocessor 124 can generate an output to send to the actuator 105. The particular output sent to the actuator 105 can depend on the current control program running and/or on the received sensor outputs. The output sent to the actuator 105 can indicate an amount of torque or force that the actuator 105 should apply, e.g., an amount of torque that the actuator 105 should apply to the bars 116a-116b.

The actuator 105 can be a right-side actuator. The powered exosuit can also include a left side actuator. Similar to how the actuator 105 is integrated in the right hinge 122a, the left side actuator can be integrated in a left hinge. In some implementations, the powered exosuit also includes a transmitter and/or a receiver. As an example, a transmitter can be used by the control electronics 104 to output sensor data to a remote management system. Similarly, a transmitter can be used by the control electronics 104 to output sensor data, determined activities, and/or determined transitions to a computing device of the wearer, such as a smart phone of the wearer. As another example, the powered exosuit can receive instructions from a remote management system through an onboard receiver, e.g., instructions to change the control program of the powered exosuit. Similarly, the powered exosuit can receive instructions and/or feedback from a computing device of the wearer through a receiver of the powered exosuit. The feedback can be used by the powered exosuit to update or train the activity detection model and/or the transition detection model. The feedback can be used by the powered exosuit to update or train the one or more ML or AI models.

In some implementations, the powered exosuit includes additional and/or different components. For example, the powered exosuit can include additional force sensors, pressure sensors, flex sensors, or the like. The control electronics 104, the microprocessor 124, the memory 126, and/or one or more sensors can be in the upper panel 110 or in the lower panel 115. The actuator 105, the upper panel 110 and the lower panel 115 can be connected externally with the internal structure 100-C of the knee-powered exosuit.

Figure 1D:
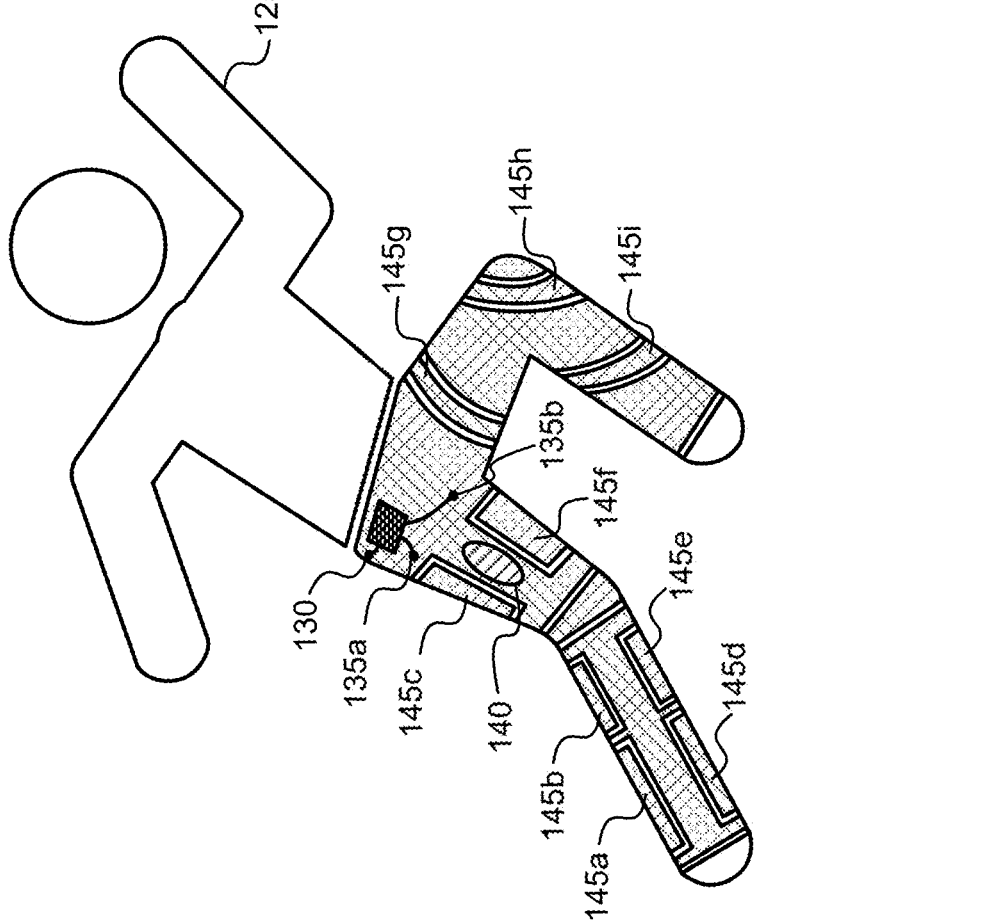
FIG. 1D shows another example implementation of the concealed and intelligent exosuit in accordance with one embodiment of the present disclosure.
Figure 1D:

FIG. 1D shows another example implementation of the concealed and intelligent exosuit in accordance with one embodiment of the present disclosure. The exemplary implementation of the exosuit comprises intelligent garment system in the form of a pair of pants to enhance the mobility of a user 125. In some other instances, intelligent garment system may be implemented in the form of a sock, a shoe, a shirt, a brace, an under-garment, or a full-body suit, among other forms of garments. For example, the intelligent garment system can be in the form of a shirt that can be worn on the user 125 upper body and provides support to torso, back, and spine of the user 125 or the wearer.

The intelligent garment system as depicted in FIG. 1D may include a controller 130, sensors 135a and 135b (collectively referred to as sensors 135), and emitters 145a, 145b, 145c, 145d, 145e, 145f, 145g, 145h, and 145i (collectively referred to as emitters 145). User 125 is a human user of intelligent garment system or exosuit. The intelligent garment system may be configured to provide dynamically adaptive support for the user 125 movement activities. A target area 140 is a muscle group of the user 125 leg, which may be automatically selected for targeted support based on the detected stride of the user 125. The intelligent garment system may receive input from the user 125 and can automatically determine a target area 140 and control the emitters 145 to produce a particular support configuration for fabric around target area 140. In some instances, the target area 140 can be manually selected by the user 125.

In some implementations, the intelligent garment system is communicatively coupled to the sensors 135, and uses data collected by the sensors 135 and the emitters 145 to determine an activity classification, optimal assistance profile, and/or a system configuration. The intelligent garment system may be coupled to the sensors 135 and the emitters 145 through communication buses within environmentally sealed conduits. The intelligent garment system may receive sensor data from the sensors 135 and the emitters 145 wirelessly through various wireless communication methods, such as RF, sonic transmission, electromagnetic induction, etc. A controller 130 may also be communicatively connected to other systems, such as the sensors 135 and/or the emitters 145 by, for example, through conductive threads linking the sensors 135 and/or the emitters 145 to the controller 130 and/or the external power source.

The sensors 135 may detect the movement activity of the target area 140 of the user 125. Detection can be done using electrical, optical, and/or magnetic techniques by sensors such as accelerometers, gyroscopes, magnetometers, inertial measurement units (IMUs), GPS, electromyography (EMG), mechanomyography (MMG), visual sensors, depth sensors, and/or encoders, among other types of detection techniques. The sensors 135 can include temperature sensors, infrared sensors, light sensors, heart rate sensors, and blood pressure monitors, among other types of sensors. In addition to detecting activity of the target area 140 of the user 125, the sensors 135 can collect and/or record the activity data and provide the activity data to the controller 130. Additionally, the sensors 135 can collect biometric data associated with the user 125. For example, the sensors 135 can detect the heart rate, eye movement, and respiratory rate, among other biometric data of the user 125. The sensors 135 may provide the user 125 movement and activity data and other data associated with the user 125 to the controller 130.

The emitters 145 may generate one or more electric fields at surrounding panels of a garment of the pair of pants (or intelligent garment system) to around the target area 140 within the user 125. The intelligent garment system includes multiple emitters 145, each of which can actuate a portion of the garment to apply force(s) or torque(s) to support or assist the limb or joint of the user 125. In some instances, actuation of the garment can, for example, affect a particular stiffness and structure of a portion of the garment. The emitters 145 can be, for example, electrodes. The emitters 145 can be powered by direct current or alternating current. The emitters 145 can be identical to each other. The emitters 145 can include emitters made of different materials.

Figure 2A:
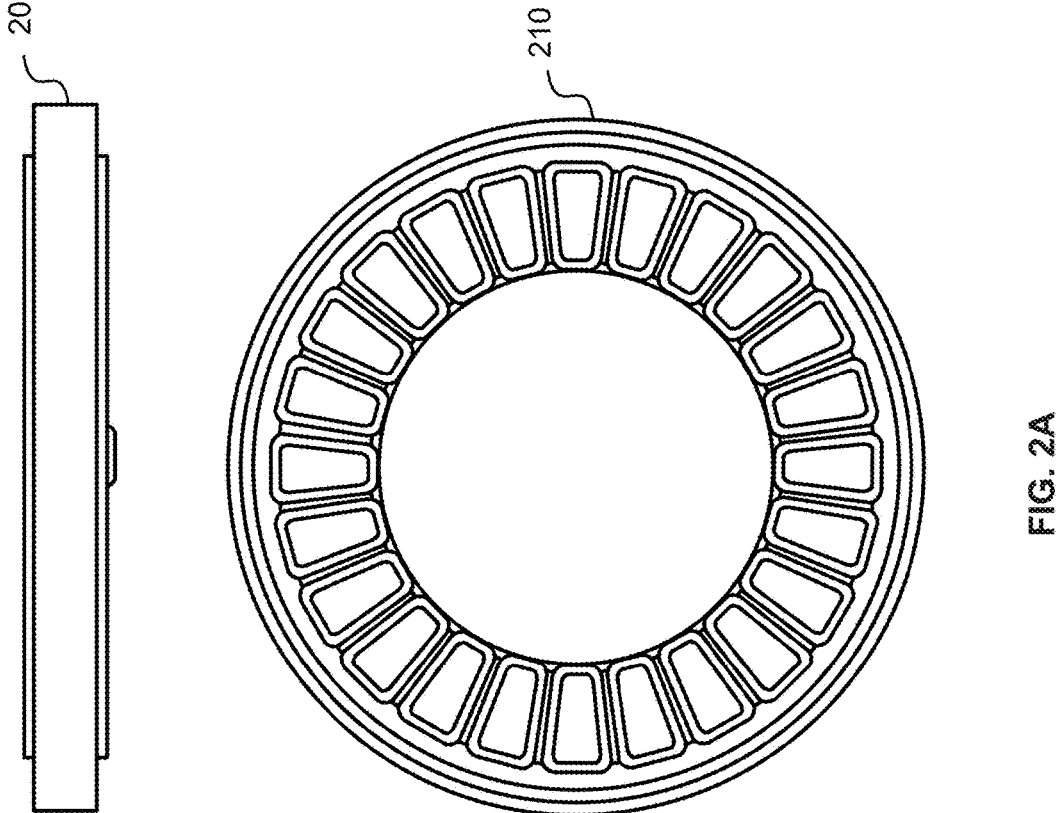
FIG. 2A shows a side view and a top cross-sectional view of an axial flux motor in accordance with an example implementation of the present disclosure.
Figure 2A:
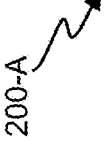

FIG. 2A shows a side view 205 and a top cross-sectional view 210 of an axial flux motor in accordance with an example implementation of the present disclosure. The off the shelf motors tend to be heavier, large in size, and may not provide high torque to support the knee powered exosuit. The axial flux motor is designed to achieve small form factor, light weight, and to provide excellent performance in multiple domains such as continuous operating torque, mass, and volume. The motor characteristics may be designed based on a customized transmission ratio or gear ratio of gearboxes such that the actuator can reliably produce the right amount of torque and/or speed to support movements of the exosuit wearer. The top cross-sectional view 210 shows a stator of the axial flux motor. The orientation of the windings of the motor may be 90 degree rotated version of the orientation of windings in commonly used radial flux motors. In this way, a magnetic field generated by a flow of current in the windings may align with an axis of rotation of the axial flux motor. According to the side view 205 of the axial flux motor as shown in FIG. 2A, the axial length of the motor is less than 10 mm with a diameter of 79 mm.

Figure 2B:
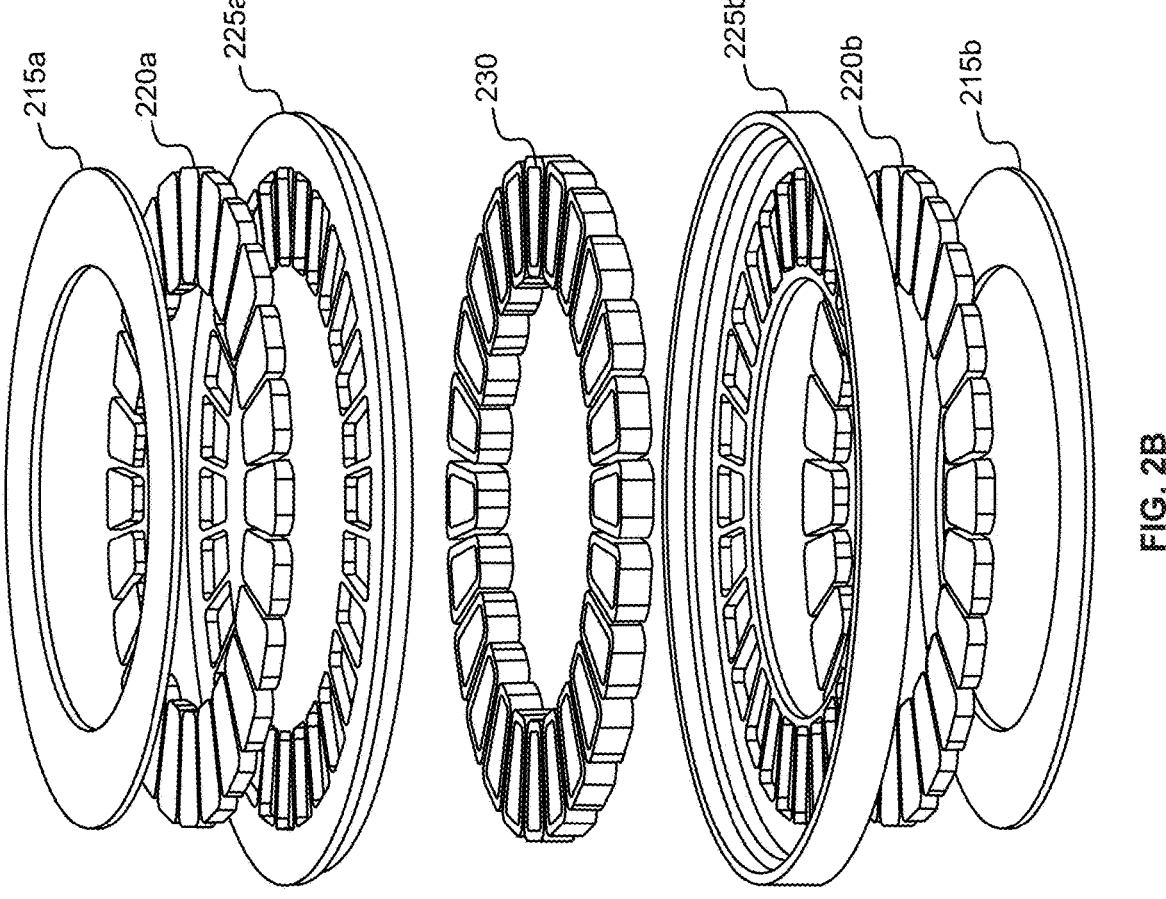
FIG. 2B shows an exploded view of the axial flux motor in accordance with an example implementation of the present disclosure.
Figure 2B:
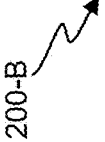

FIG. 2B shows an exploded view of the axial flux motor in accordance with an example implementation of the present disclosure. The axial flux motor disclosed herein is an axial flux permanent magnet (AFPM) motor with yokeless stator. The AFPM motor (also referred herein after as "the motor") comprises of a stator 230, dual-rotors 225a-225b with permanent magnets 220a-220b, and back-irons 215a-215b. The AFPM motor is configured to have dual-rotors 225a-225b with permanent magnets 220a-220b affixed circumferentially. The dual-rotors 225a-225b comprises of a top rotor 225a and a bottom rotor 225b.

The stator 230 may be comprised of stator teeth in the form of a circular array. The stator 230 is a yokeless stator. Therefore, the individual stator teeth cannot be connected to a yoke, which is normally made up of cast iron. The stator teeth can be wound with coils of copper windings. The windings are arranged in such a manner that the magnetic field generated by the flowing current is aligned on an axis parallel to a rotational axis of the motor. In this way, the magnetic field from one coil can apply a torque to two magnets simultaneously (e.g., a magnet of the top rotor 225a and the bottom rotor 225b). In some instances, the stator 230 may comprise multiple laminations. More specifically, the stator 230 comprises laminations of ferrous material, preferably iron, that are separated by non-conducting, non-ferrous layers to minimize losses due to eddy currents of magnetic flux within the stator.

The AFPM motor with yokeless stator may have a relatively smaller weight of stator core, lower iron losses, shorter end-windings, and a higher winding fill factor, which may facilitate achieving a higher power density or a higher torque density along with better efficiency of the motor. The stator is mechanically and magnetically separated without yoke, which can reduce the cost, volume, weight and unnecessary losses of the motor. The yokeless stator may be composed of soft magnetic composites (SMC) materials such as Somaloy 1000 3P or other new materials, such as amorphous alloy. The SMC can be compacted just like other powder metal particles. Heated die compaction can be used to promote higher density.

The coppers windings can be wound around an appropriately shaped mandrel and can be installed easily on the stator teeth of the AFPM motor. In case of the radial flux motor, the windings may be wound around the stator teeth by hand or with a machine using a process similar to knitting. Since the stator teeth are pie-shaped, the coils can be more efficiently packed into the motor volume. In one instance, the wire fill factor is greater than 80%. The coils that belong to same phase of 3-phase electric supply may be connected in series. In some instances, the coils corresponding to three phases of electric supply may be connected in WYE configuration to achieve a low RPM and a high torque. While in other instances, the coils corresponding to three phases of electric supply may be connected in Delta configuration for relatively higher RPM and lower torque. Moreover, according to some embodiments, a dLRK winding scheme, which is a derivative of a LRK winding scheme may be used to wound the coils on the stator teeth. In other embodiments, a variation of the dLRK scheme, for example, a dLRK Evolution winding scheme may be used.

The dual-rotors 225a-225b may be comprised of two aluminum structures that can have openings to hold the permanent magnets 220a-220b in place. Two halves of the dual-rotor 225a-225b then can be assembled together on either side of the stator 230 to make a single piece that can also be connected to a gearbox to form an actuator. A thin piece of circular steel plate also referred herein as back-irons 215a-215b may be installed on the back of the aluminum parts on each side or over the magnets to avoid leakage of magnetic flux. The top rotor 225a and the bottom rotor 225b can be set equidistant from the stator 230, thus having identical air gaps. In some instances, the dual-rotors 225a-225b may be placed with a different air gap from the stator 230. Both rotors may be connected to an input shaft substantially in the middle of the dual-rotors 225a-225b and along the axis of rotation. The connection with the input shaft may restrict relative rotation between the top rotor 225a and the bottom rotor 225b. Moreover, the number of permanent magnets 220a-220b on each rotor may determine the number of poles of the motor. For example, if 28 magnets are adhered to each of the dual-rotors 225a-225b, then the motor can have 28 poles. The permanent magnets 220a-220b may be attached to the dual-rotors 225a-225b in such a way that the permanent magnets 220a-220b north-seeking faces and south-seeking faces can be arranged alternatingly outwardly.

After assembling the dual-rotors 225a-225b and winding the stator teeth, the stator teeth and coils may be put into a mold and cast thermally conductive epoxy around them. This motor assembly may enforce the coils to hold in place and can create a mounting surface to attach the motor to the actuator. In addition, a winding resistance increases with an increase in the internal temperature of the motor, that results in a decrease in the magnetic performance of the permanent magnets 220a-220-b and the efficiency of the motor may deteriorate as well. Therefore, the thermally conductive epoxy may act as a cooling system to improve the performance of the motor. According to present disclosure, the disclosed motor geometry may achieve better performance than the off the shelf brushless motors of similar size in terms of the continuous operating torque, the mass, and the volume. Moreover, the disclosed motor design may be less costly and more efficient to produce at scale. As actuators may typically cost more than half of the predicted bill of materials (BOM), therefore, the disclosed motor and/or actuator may significantly reduce the cost of the powered exosuit, while improving its accessibility and battery life.

In one example implementation of the AFPM motor as described above, the design parameters are shown in Table 1. The exemplary implementation of the AFPM motor can be operated at an RMS continuous current of 8.5 A according to thermal modeling and hence, the AFPM motor may continuously run an inclined gait cycle with 25 Nm peaks. The exemplary implementation of the AFPM motor can be compared with commercially available motors of similar size (e.g., diameter and/or axial length). For example, the disclosed AFPM is about 57% smaller in volume, 31% more powerful (based on Km—motor constant), and 9% lighter as compared to T-motor MN7005 radial flux motor having similar diameter.

TABLE 1

The AFPM motor design parameters
for the example implementation

| Prototype parameters | Parameters values |
|---|---|
| Number of stator coils | 24 |
| Number of rotor poles | 28 |
| Number of phases | 3 |
| Back-iron thickness/axial length (mm) | 1.00 |
| Magnetic air gap (mm) | 0.25 |
| Total assembly length (axial, mm) | 8.50 |
| Stator material | Somaloy 1000 3P |
| Wire fill factor (%) | 89.7% |
| Coil resistance (per coil) | 0.0265 |
| Torque constant - Kt (Nm/A) | 0.132 |
| Motor constant - Km (Nm/sqrt(W)) | 0.202 |
| Motor magnetic circuit mass (grams) | 107.3 |
| Maximum continuous operating torque - T2 (Nm) | 0.65 |
| Output speed - S2 (RPM) | 2500 |
| Efficiency @ T2, S2 & 20° C. (%) | 94.4% |

Figure 2C:
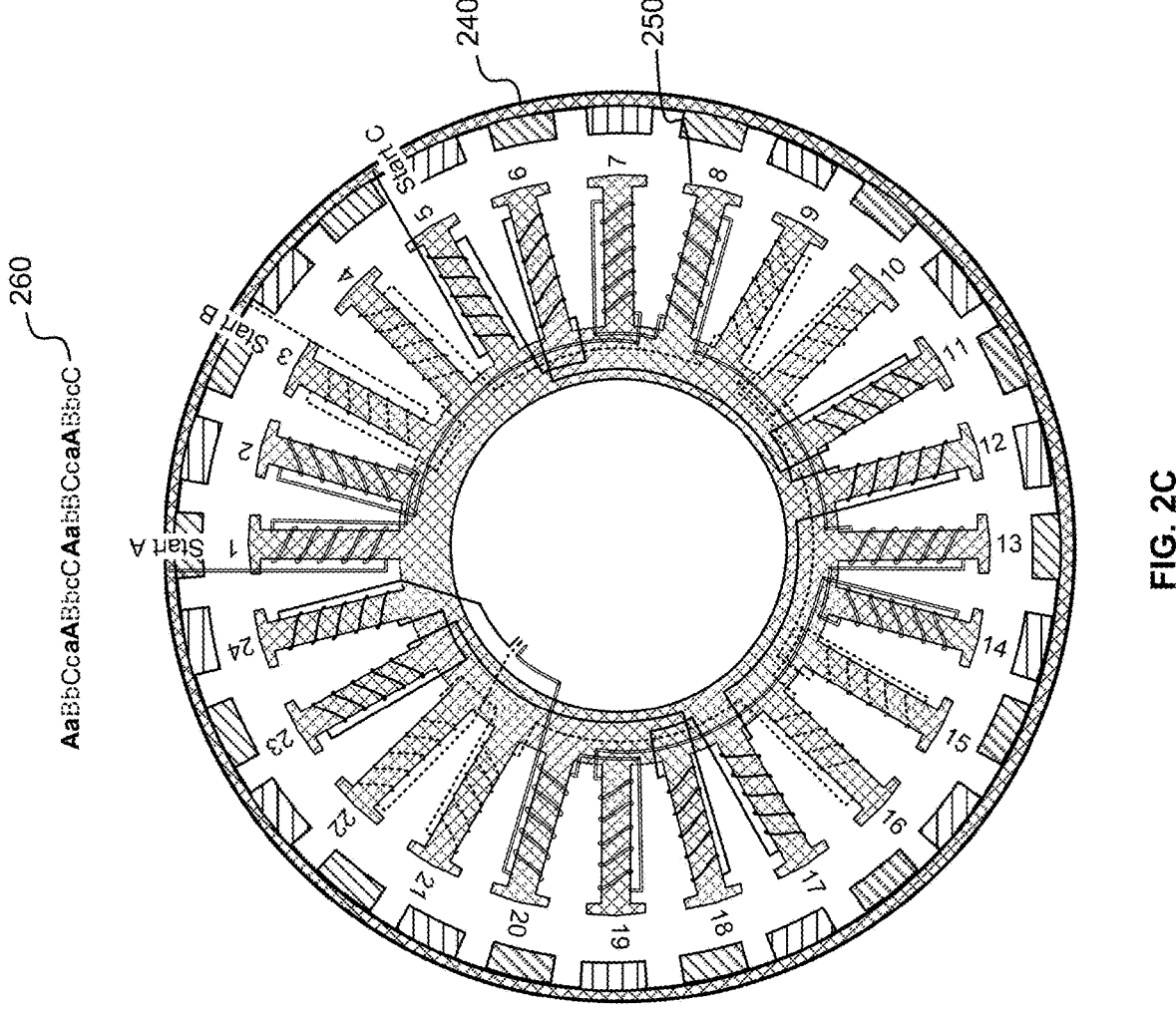
FIG. 2C shows an example illustration of dRLK evolution winding scheme using a brushless out runner motor.
Figure 2C:
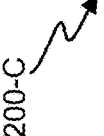

FIG. 2C shows an example illustration of dRLK evolution winding scheme using a brushless out runner motor. The brushless out runner motor as depicted in FIG. 2C is a 24N28P motor. An inner stator 250 of the 24N28P motor may have 24 stator teeth. Similarly, an outer rotor 240 may have 28 poles or permanent magnets. The letters ABC corresponds to different phases of 3 phase electric supply. A winding sequence based on the DRLK evolution winding scheme for the 24N28P motor can be AabBCcaABbc-CAabBCcaABbcC 260. In the winding sequence, capital letters "A, B, or C" corresponds to clockwise winding (CW) of that phase and small letters "a, b, or c" corresponds to counterclockwise winding (CCW) of that phase, respectively. For example, for a winding sequence AaBbCc may be interpreted as: using phase A to wind tooth 1 CW, then continue to tooth 2 and wind it CCW. Afterwards, using Phase B to wind tooth 3 CW, then continue to tooth 4 and wind it CCW. Lastly, using Phase C to wind tooth 5 CW, then continue to tooth 6 and wind it CCW. In the depicted example of FIG. 2C, the phase-A winding starts with tooth 1 and ends on tooth 20. The phase-B winding starts with tooth 3 and ends on tooth 22. Similarly, the phase-C winding starts with tooth 5 and ends on tooth 24. Moreover, in the example illustration the 3 phases are connected in WYE configuration, e.g., end point of windings of each phase are connected together.

Figure 3:
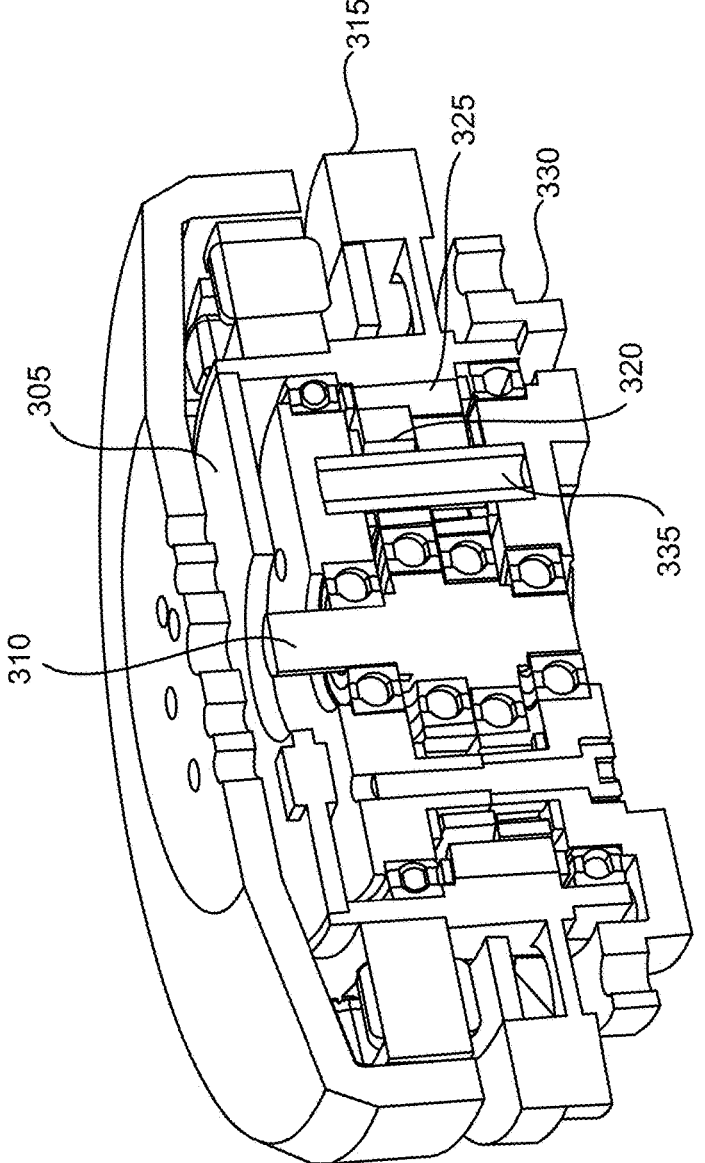
FIG. 3 shows a cross-sectional view of an actuator in accordance with some embodiments of the present disclosure.

FIG. 3 shows a cross-sectional view of an actuator in accordance with some embodiments of the present disclosure. The actuator may comprise the cycloid transmission connected substantially in the middle of a brushless motor. The brushless motor can be the AFPM motor or the radial flux motor. The actuator may be in a compact pancake shaped with a small form-factor. The actuator can be attached easily on the knee-powered exosuit externally at knee location. Due to the small form factor, the actuator can blend well with the exosuit or knee and may not come out or make the wearer uncomfortable. In the exemplary implementation as shown in FIG. 3, the actuator comprises of a dual-disk, lobed cycloid transmission within an inner bore of a brushless out-runner motor. The actuator may also include a torque sensor 315 and an encoder PCB 305. The encoder PCB 305 may comprise a motor encoder and an output encoder. The encoder PCB 305 can also host a signal amplifier for the torque sensor 315. The motor encoder may provide an absolute position within one mechanical revolution and/or incremental position of a rotor of the motor. Similarly, the output encoder may provide absolute joint position or angle. Both the encoders can be magnetic encoders and can be mounted on either side of the PCB. The PCB is connected with a ribbon or flat flex wire that may pass between the stator and the ring gear, out of the cycloid transmission to a motor controller PCB. The motor controller PCB may utilize the output of the motor encoder and the output encoder for commutation of the motor.

The cycloid transmission may comprise a cycloid disk 320, a ring gear with multiple ring pins 325, output pins 335 or rollers connected with an output connection 330 or disk. The cycloid transmission (or cycloid drive or cycloid speed reducer) can be used to reduce the speed of an input shaft by a certain ratio and with a low backlash. On one side, the input shaft may be connected with the rotors of the brushless motor. On the other side, the input shaft may be connected with a bearing in an eccentric manner and hence the input shaft can also be called an eccentric shaft 310. The eccentric shaft 310 may drive the bearing eccentrically that in turn drives the cycloid disk in an eccentric, cycloidal motion. The ring pins 325 are fixed and can be arranged in a circle around the eccentric shaft 310, in which the cycloid disk 320 engages. The perimeter of the cycloid disk 320 is geared to the ring gear, which is fixed and may remain stationary. The number of ring pins 325 on the ring gear is larger than the number of pins or lobes on the cycloid disk 320. The cycloid disk 320 may independently rotate around the eccentric bearing as it is pushed against the ring gear. The cycloid disk

320 has holes that are larger (by an amount equal to the eccentricity of the input shaft) than the output pins 335 or rollers that go inside the holes. The output pins 335 or rollers can directly drive the output connection 330 or disk as the cycloid disk 320 rotates. The direction of rotation of the cycloid disk 320 and the output connection 330 or disk is opposite to that of the input shaft or the eccentric shaft 310. The output rollers may move around in the holes to achieve steady rotation of the output shaft from a wobbling movement of the cycloid disk 320. In some instances, to achieve symmetrical load distribution, two cycloid disks 320 may be used, which can have an offset by 180°. In this way, unbalanced forces may compensate each other, resulting in smoother operation at high speeds. The dual-disk design of the cycloid transmission may also allow high torque to be transmitted through the output shaft.

The cycloid transmission can be designed to achieve a custom gear ratio for a given torque-speed profile of the knee-powered exosuit. In some instances, the gear ratio of 22:1 may be used in the actuator of the knee-powered exosuit. The output connection 330 or disk (or output shaft) may complete a revolution (360 degree) only after 22 revolutions of the eccentric shaft 310.

Figure 4:
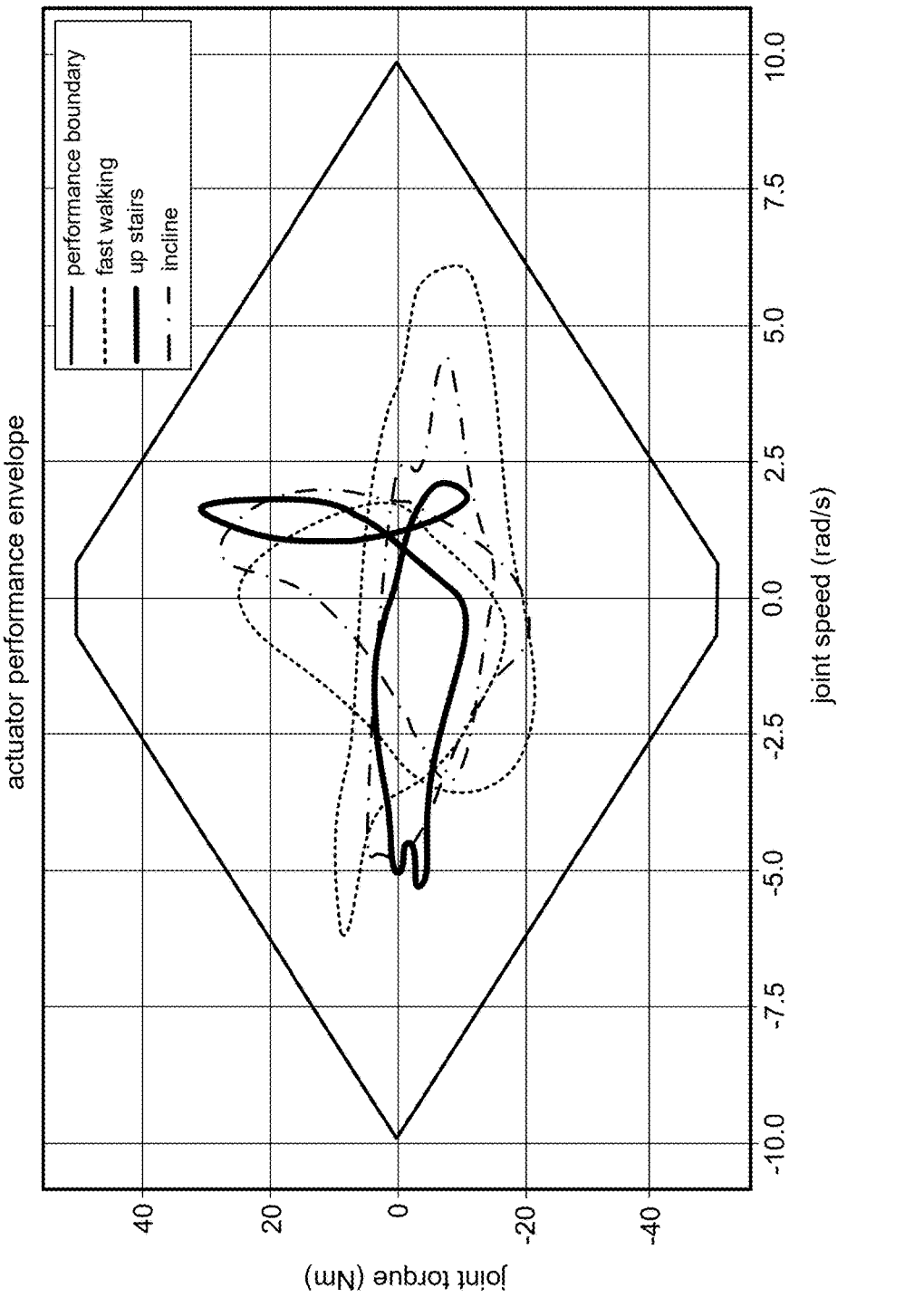
FIG. 4 illustrates a performance plot of an exemplary implementation of the actuator of FIG. 3.

FIG. 4 illustrates a performance plot of an exemplary implementation of the actuator of FIG. 3. For the exemplary implementation of the actuator, the off the shelf radial flux motor such as a T-motor anti-gravity 7005 115 kv motor is used with the cycloid transmission. A gear ratio of 22:1 is used in the cycloid transmission. The T-motor 7005 has a motor constant (Kt) of 0.083 Nm/A and comprises 14 pole pairs. The exemplary actuator achieved a weight of 304 grams. The exemplary actuator is used in the knee-powered exosuit. Data of the exosuit sensors is collected during different movements of the wearer. The different movements include fast walking, upstairs walking, and inclined walking. The performance plot is drawn between knee-joint torque (Nm) versus knee-joint speed (rad/s) by using the collected data. The red envelope represents the performance boundary of the exemplary actuator. According to the performance boundary, the exemplary actuator can achieve a max torque of 50 Nm and a max joint speed of 9.9 rad/s. It can be seen that, the exemplary actuator can provide a continuous torque of 30 Nm during the upstairs walking (as shown in FIG. 4 by yellow color). Moreover, torque-speed characteristics of different movements can be accommodated well within the performance envelop of the exemplary actuator.

Figure 5A:
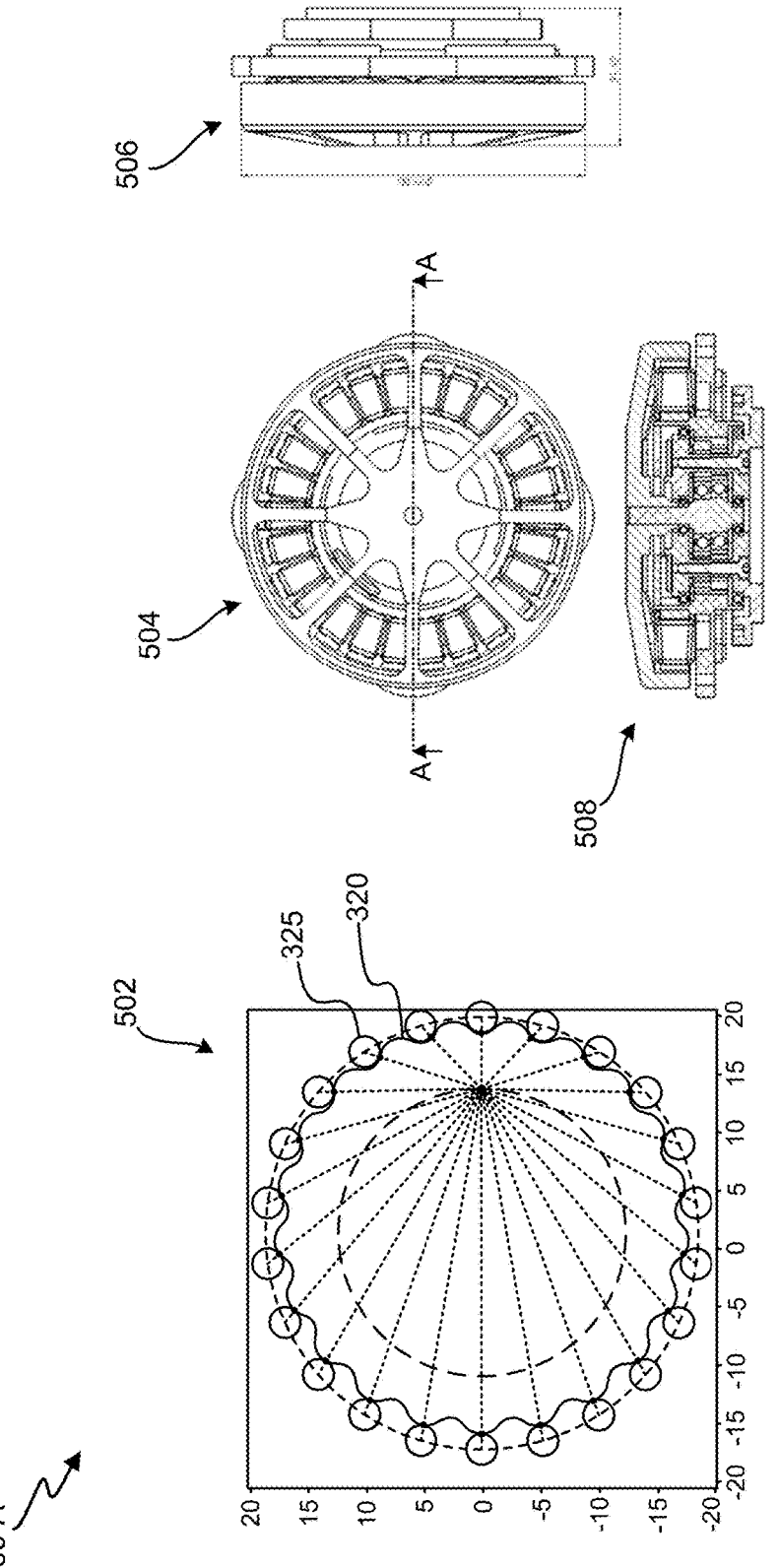
FIG. 5A shows an example illustration of the cycloid transmission.
Figure 5B:
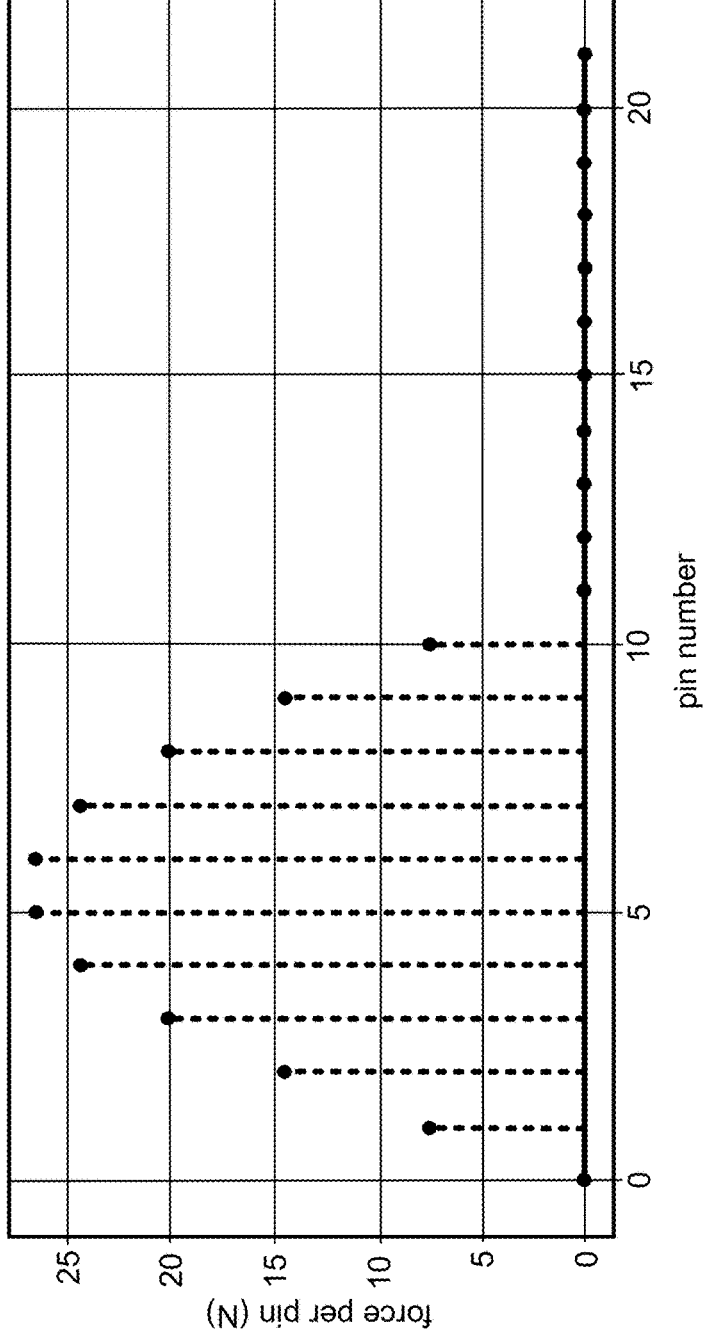
FIG. 5B illustrates a three-dimensional view of a cycloid disc that may be used to support cycloid transmission.
Figure 5B:

FIG. 5A shows an example illustration of the cycloid transmission. The ring pins 325 are fixed and can be arranged in a circle around the eccentric shaft 310, in which the cycloid disk 320 engages. In the example illustration, twenty-two ring pins 325 are making the ring gear. The cycloid disk 320 has twenty-one lobes. The eccentric shaft 310 may be rotated on an inner dotted circle as shown in black color. The blue lines in the left image are vectors that can be used to calculate a predicted force on each pin. FIG. 5B illustrates a three-dimensional view of a cycloid disc that may be used to support cycloid transmission.

Figure 6:
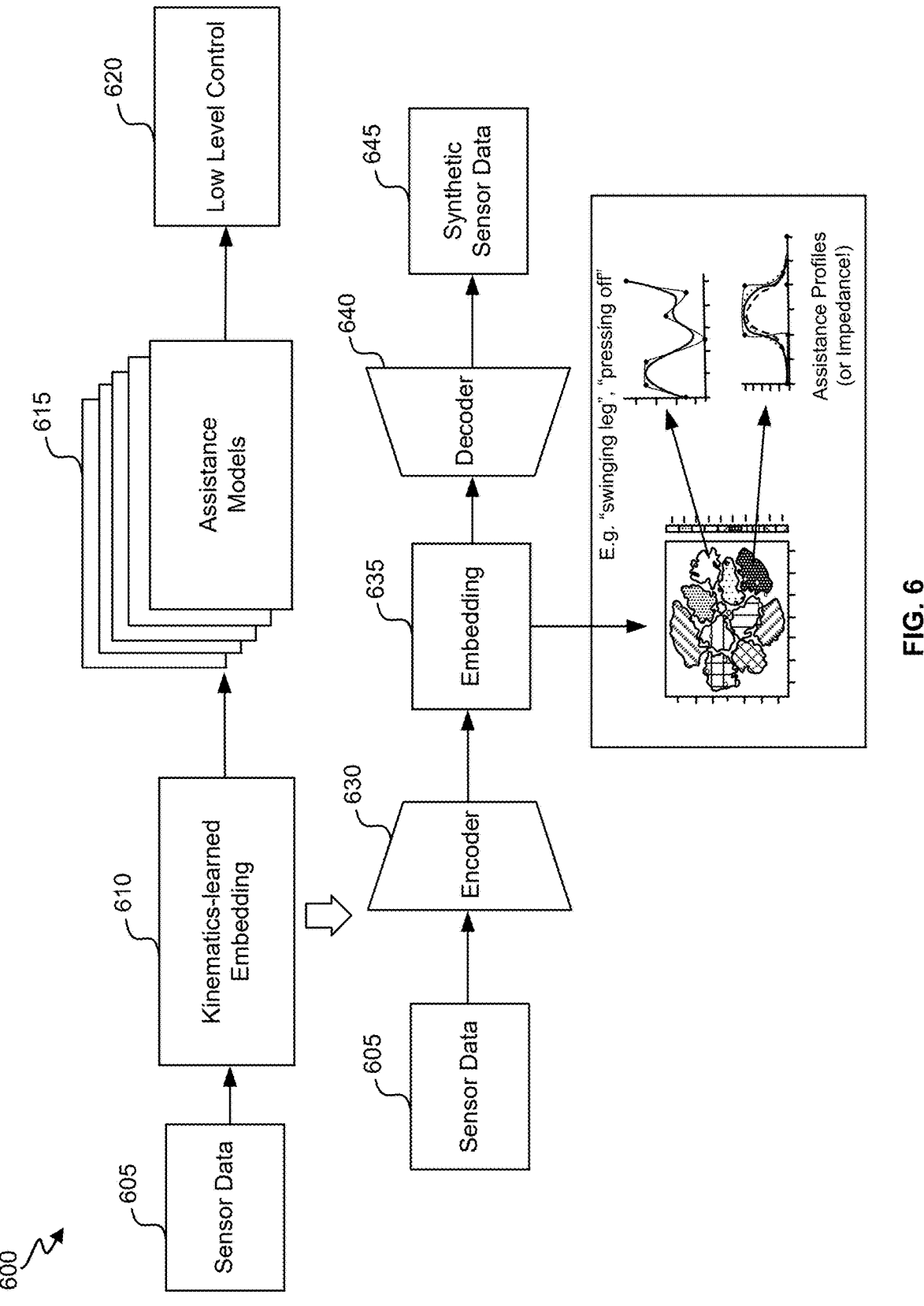
FIG. 6 is a block diagram illustrating an example overview of a control system of the powered exosuit to determine movement support for the wearer in real-time in accordance with some embodiments of the present disclosure.

FIG. 6 is a block diagram illustrating an example overview of a control system of the powered exosuit to determine movement support for the wearer in real-time in accordance with some embodiments of the present disclosure. Traditionally, the current exoskeletons mainly rely on optimized task-specific controllers (e.g., walking, stairs ascent or descent etc.) and switch between the task-specific controllers based on a classification approach that classifies tasks. In the real world, it is quite difficult or impossible to classify movements into discrete activities or tasks. Another approach to control the powered exosuit is to use task-agnostic controllers which can adapt over changing activities. But the task-agnostic controllers can be difficult to tune to achieve high performance for any activity in particular.

According to the control system of the powered exosuit as illustrated in FIG. 6, sensor data 605 may be used to generate an embedding 635 based on a kinematics-learned embedding model 610. The sensor data 605 may capture the movements of the wearer of the powered exosuit. For example, the sensor data 605 may include inertial measurement unit (IMU) signals representing acceleration and angular velocity of lower and/or upper leg of the wearer. The kinematics-learned embedding model 610 may simplify the representation of human movement by transforming the sensor data 605 into a lower-dimensional latent space representation. Different dimensionality reduction or encoding techniques including but not limited to principal component analysis (PCA), or auto encoders may be used as the kinematics-learned embedding model 610. In the lower-dimensional latent space, the embedding 635 may then be assigned a cluster by using a clustering technique. The clustering technique may assign the cluster to the embedding 635 based on a degree of similarity with other embeddings in a set of clusters. The other embeddings may be generated using a dataset comprising of sensor data 605 of previous movements of multiple wearers or users of the powered exosuit. Each cluster may correspond to a movement primitive (MP). Many disparate tasks (e.g., stair ascent, shuffling) can be described as a sequence of movement primitives. The term "primitives" may refer to a set of modular and short duration movements that can be used to represent continuous movements corresponding to disparate tasks. Some of these primitives can be found in many tasks (e.g., level ground walking and stair ascent both feature knee flexion in a swing phase). Some primitives may be specific to certain tasks. A cyclic activity, for example walking can be considered as a periodic sequence of movement primitives.

In some embodiments, a different controller or assistive model 615 may be designed for each of the movement primitive that is discovered within the lower-dimensional latent space or an embedding space. After generating the embedding 635 by the kinematics-learned embedding model 610 based on the sensor data 605. The embedding 635 can be mapped to a cluster or a movement primitive and a corresponding assistive model 615 may be activated to provide movement support in real-time to the wearer. The assistive model 615 may implement the torque-speed profile of the movement primitive by adjusting the torque or rpm of the actuator in real-time using a low-level control 620. The low-level control 620 may comprise control electronics, or motor controller PCB of the knee-powered exosuit.

To implement controllers or assistive models 615 for the movement primitives, the dataset covering broad spectrum of structured and unstructured activities or movements may be generated by different individuals wearing the powered exosuit. The dataset comprises of the sensor data 605 of the powered exosuit. The embedding space may be created by training the kinematics-learned embedding model 610 in an unsupervised manner. Therefore, as activity labels are not needed, a large dataset can be generated easily. In some embodiments, the dataset may be used to train an autoencoder model. The autoencoder model may be comprised of two main components: an encoder 630 and a decoder 640. The encoder 630 may take the sensor data 605 as an input and may compress it into the embedding 635 in the lower-dimensional latent space or the embedding space. The decoder 640 may then reconstruct the sensor data 605 (or generating synthetic sensor data 645) from the latent space representation or the embedding 635. The autoencoder model can be trained so that an output data (i.e., synthetic sensor data 645) may closely match with an input data (i.e., the sensor data 605). Consequently, the autoencoder model may learn to represent a dense input (the sensor data 605) in a compact embedding space while preserving the essential features for data reconstruction. In some instances, a window size of 0.2 s may be used to capture the sensor data 605 from the powered exosuit. The duration of the window size is selected based on the duration of movement primitives, which is typically around 0.2 s. Thus, the kinematics-learned embedding model 610 may utilize the trained encoder 630 to transform the sensor data 605 of 0.2 s duration into the embedding 635.

Furthermore, the embeddings 635 that are based on the sensor data 605 of similar movements may be located close to each other in the embedding space. For example, based on the embeddings 635 of the dataset, a shuffle step may be spatially located somewhere in between standing and walking. A clustering technique such as a gaussian mixture model (GMM) or k-means may be used to group similar embeddings into clusters. Each cluster may represent a different movement primitive. Accordingly, each cluster may correspond to a different assistance model or assistive model 615. For example, as depicted in FIG. 6 bottom part, a first cluster (orange color) and a second cluster (turquoise color) may correspond to a "swinging leg" and a "pressing-off" movement primitive and hence, a completely different assistance may be applied with the actuator.

Figure 7:
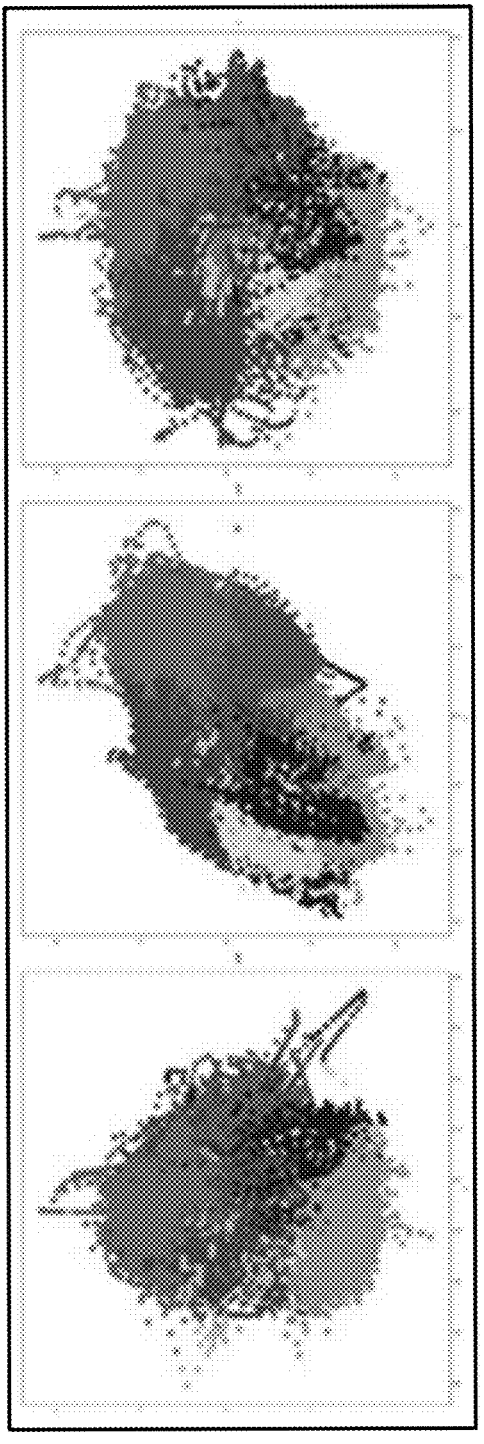
FIG. 7 shows an illustrative example of three slices of 64D embedding space in accordance with an embodiment of the present disclosure.

FIG. 7 shows an illustrative example of three slices of 64D embedding space in accordance with an embodiment of the present disclosure. After training the autoencoder model the encoder 630 may be used to transform segments of the dataset having duration 0.2 s into a 64D embedding space. Clustering techniques, such as the GMM may be used to define clusters that may group similar embeddings together in the 64D embedding space. Each cluster may then correspond to the movement primitive. The movement primitives may represent discrete, human-interpretable movements (e.g., stance phase of stair ascent) that correspond to states in the task-specific controllers, or the primitives may be novel representations of movement. The GMM model may utilize soft-assignment approach and assign clusters probabilistically. For example, walking up a shallow incline may be a mixture of "level-ground" and "incline" walking. As depicted in FIG. 7, the dataset was clustered into ten primitives and each primitive is represented in a different color. Moreover, three slices of 64D embedding representation of the dataset are also shown.

Figure 8:
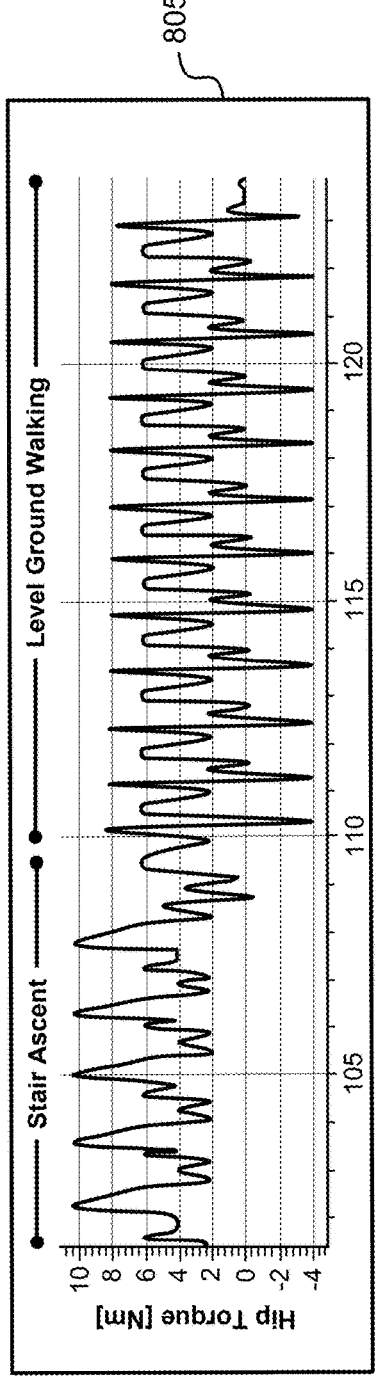
FIG. 8 illustrates an example of cluster assignment during stair ascent and level ground walking by the GMM model in accordance with an embodiment of the present disclosure.
Figure 8:
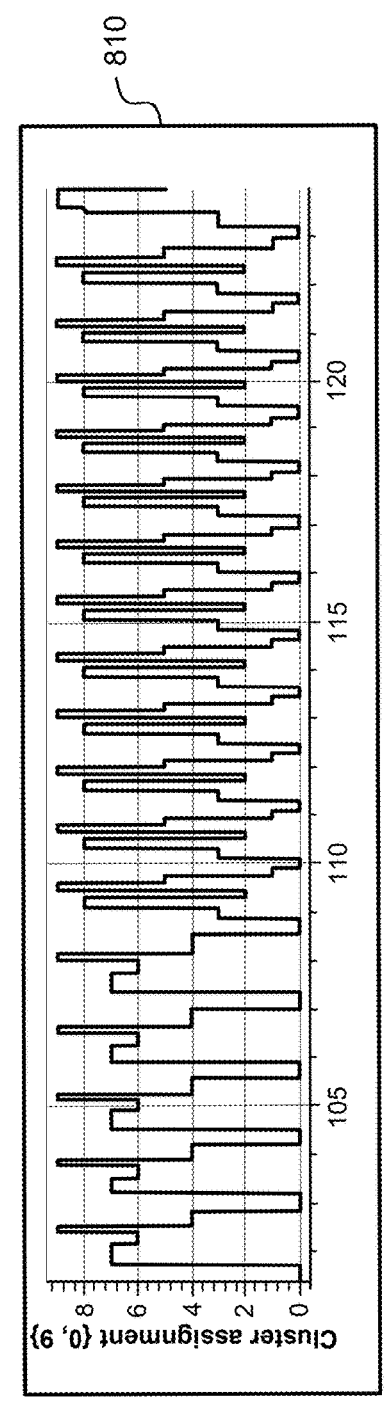

FIG. 8 illustrates an example of cluster assignment during stair ascent and level ground walking by the GMM model in accordance with an embodiment of the present disclosure. A labeled dataset of the powered exosuit may also be collected when the wearer is performing different known movements or labeled activities such as stair ascent, level ground walking, stair descent etc. The top plot 805 shows a time-series data of the powered exosuit that can be captured during pilot test of stair ascent and level-ground walking. X-axis represents time in seconds. The time-series data is periodic, and each period of signal may correspond to a walking stride or gait cycle. The bottom plot 810 shows the cluster assignment based on the sensor data 605 during the pilot test of stair ascent and level-ground walking. The cluster assignment is also periodic similar to the time-series data. The sequence of cluster assignments may change between stair ascent and level-ground walking. Clusters that are present in both stair ascent and level-ground walking may represent motion or movement primitives that are shared between these two activities, for example, walk swing phase.

The number of clusters may be adjusted iteratively to prepare the exosuit controller to generalize across movements while keeping effective controllers (or task-specific controllers) for known primitives. The labeled dataset may be processed through the encoder 630 to generate embeddings 635 and the GMM model can be used to cluster the embeddings 635. By comparing clusters to states of the task-specific controllers (or previously existed effective controllers), it can be assessed that whether there are enough clusters available or not to capture distinct movement phases with different movement control strategies. For example, if stair ascent stance and level-ground stance are assigned to the same cluster, despite needing different control laws for optimal assistance, then the cluster count may be increase and regrouping the embeddings of the labeled dataset. This process may continue until adequate data coverage is achieved. In some instances, increasing cluster count alone may not separate some movements that are kinematically similar but may need different controls. For these scenarios, the joint torque may be incorporated in the autoencoder model, so that the embeddings 635 and clusters are also informed by an expected amount of assistance.

A control law (or assistive model) may be assigned to each cluster based on the labeled dataset. The labeled dataset may be processed through the encoder 630 and clustering (the GMM), and the resulting clusters can be compared with the states in the controllers (or task-specific controllers). For example, for the clusters that contain known data from stair ascent states, the corresponding control parameters may be utilized from a previously optimized controller. In this way, gold-standard controls can be retained for known tasks. The unknown activities located nearby in the embedding space may also benefit from similar controls. For example, a single step up on a curb can be automatically clustered with similar movement primitives cycled through during stair ascent, and be assigned appropriate controllers, even though a control law for that task was not explicitly trained. Unlike black-box machine learning (ML) approaches, control laws for clusters can be fine-tuned during on-device testing with human-in-the-loop methods. Moreover, during real-time device (exosuit) assistance, filters may be used to smooth transitions between movement primitives. In addition, by leveraging soft cluster assignments of the GMM model to blend controls, abrupt transitions can further be avoided which are typically present in traditional classification methods.

Figure 9:
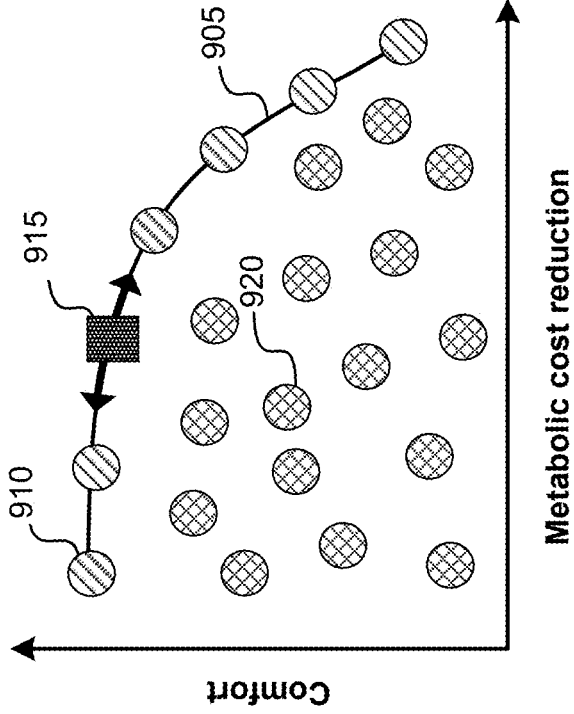
FIG. 9 shows an exemplary plot of different exosuit controllers and a pareto front in accordance with some embodiments of the present disclosure.
Figure 9:

FIG. 9 shows an exemplary plot of different exosuit controllers and a pareto front 905 in accordance with some embodiments of the present disclosure. Different users may have distinct preferences for their device or exosuit behavior, and users may prefer to have some flexibility to directly adjust the device. For example, users often want the controller to be "stronger" for more assistance or "softer" for more comfort. Accordingly, in some embodiments of the present disclosure, techniques are disclosed to personalize exoskeleton controls quickly and intuitively through user-specific fine-tuning of the controller. The user or wearer may provide an input through a simple interface of the powered exosuit or device. The simple user interface may include a single input dial, an up/down button, a gesture recognition module, or a voice command recognition module. The input corresponds to a level of assistance or level of resistance in performing the movements, as set by the user.

To implement fine-tuning of the controller, a multi-objective optimization may be performed along two or more metrics to discover the Pareto front 905. For example, the Pareto front 905 can be obtained along two metrics such as comfort level and metabolic cost (or metabolic cost reduction or metabolic benefit). The concept of Pareto front 905 or set of optimal solutions in the space of objective functions in multi-objective optimization problems stands for a set of solutions that are non-dominated to each other but are superior to the rest of solutions in the search space. The controller may be designed in such a way that with a single 1-D input from the user, multiple control parameters can be varied by selecting a different point or a non-dominated controller (red dots 910) along the Pareto front 905.

FIG. 9 illustrates the concept of tunable exosuit controller based on the Pareto front 905. Each dot may represent a controller with different parameters. The controllers are evaluated along two metrics: the comfort and the metabolic cost. Using a multi-objective optimization algorithm, the non-dominated controllers (red dots 910) may define the Pareto front 905 (red line). An active controller (black square 915) may be adjusted along the Pareto front by selecting a different non-dominated controller (red dots 910) based on a 1-D input of the wearer or the user. This may improve the user's ability to tune the device or exosuit according to his preferences.

According to some embodiments, for each movement primitive, an active controller may be defined by 2 control parameters: a stiffness value for impedance control and a torque value. Based on the control parameters, the controller may be optimized for each of the metrics at first. For optimizing comfort level, a preference-based optimization can be performed. For example, by asking the user whether "is this more or less comfortable". For metabolic cost, a human-in-the-loop optimization may be used. Traditionally, a 4-hour walk is used to measure the metabolic cost. In one instance, two-minute estimates of metabolic cost may be computed using a Cosmed K5 system. These estimates may then be used to train a machine learning model, which is configured to estimate metabolic cost based on the sensor data. Different features may be extracted from the sensor data and can be used in the machine learning model to estimate the metabolic cost. The features may include energy expenditure, calories burnt, breathing rate, or heart rate etc.

Afterwards, to construct the Pareto front 905 a constraint-based approach may be used. In the multi-objective optimization, the constraint may be implemented as varying minimum metabolic costs. In some instances, an augmented population method (e.g., like genetic algorithms) may be used for the multi-objective optimization. After conducting the multi-objective optimization and obtaining the Pareto front 905, the performance of the controllers along the Pareto front may be compared for metabolic cost and user-rated comfort. Moreover, it can also be compared with single-objective optimized parameters. Furthermore, the variation in control parameters may be analyzed to infer heuristic approximations.

In some other embodiments, the exosuit controller may adapt automatically without the input from the wearer. The disclosed technique may include continuous sensing and analysis of movements of the wearer and automatically adjust the controller to provide less or more assistance based on deviation in one or more movement features. The sensor data of the powered exosuit may be received during a first time interval and a first set of features may be extracted. Similarly, the sensor data of the powered exosuit may be received during a second time interval and a second set of features may also be extracted. The first set of features and the second set of features may be compared to detect a change in one or more features. If the change in the one or more features exceed a threshold value, the exosuit controller may be adjusted accordingly to vary the degree of assistance to the wearer by the powered exosuit.

In some instances, an updated value of the degree of assistance may be determined based on a magnitude and a sign of the change in the one or more features that exceed the threshold value. The first set of features and the second set of features may include at least one of: a gait speed, a stride height, a stride length, an estimated calories burnt, or an estimated fatigue. Moreover, the sensor data may include at least one of: an acceleration of an upper leg, an acceleration of a lower leg, an angular velocity of the upper leg, and an angular velocity of the lower leg.

Figure 10:
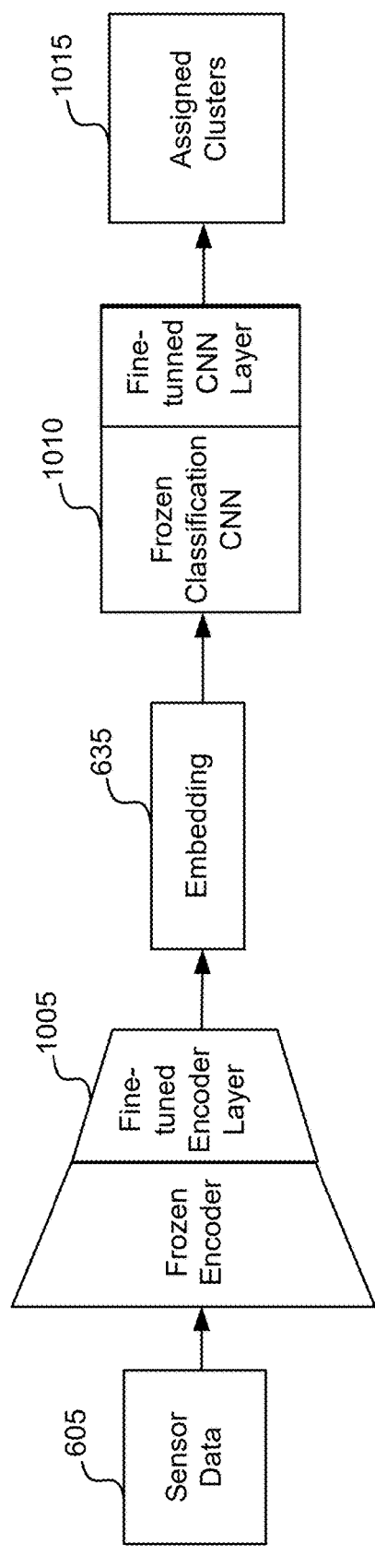
FIG. 10 shows a workflow for using fine-tuned models to assign data from sensors in an exosuit to a cluster characterizing movement.

FIG. 10 shows a workflow for using fine-tuned models to assign data from sensors in an exosuit to a cluster characterizing movement of a user. As described above, the sensor data 605 may capture the movements of the wearer of the powered exosuit. For example, the sensor data 605 may include inertial measurement unit (IMU) signals representing acceleration and angular velocity of lower and/or upper leg of the wearer.

The sensor data 605 can be processed by an encoder 1005 to generate embeddings 635. The encoder 1005 can include one or more frozen layers and one or more fine-tuned layers. The frozen layer(s) may include weights that were learned using other sensor data associated with other users and other exosuits. In some instances, the weights of the frozen layer(s) may have been learned by requesting that the other users wearing the other exosuits perform one or more particular types of movement (e.g., in a laboratory or controlled setting). Meanwhile, the weights in the fine-tuned layer(s) may be learned for the exosuit that includes the sensor(s) that collected the sensor data 605. The finetuning may include updating the model's weights through backpropagation based on the error between the model's predictions and the actual sensor data. This process may involve feeding the sensor data into the encoder, computing the loss, and adjusting the parameters of the targeted layer to minimize this loss, thereby enhancing the model's performance for that specific user's data. The fine-tuning may be performed to adjust weights such that the embeddings better capture movement primitives associated with the exosuit and/or user.

The embeddings 635 can then be fed to a convolutional neural network 1010, which can generate one or more cluster assignments 1015. The convolutional neural network can include one or more frozen layers and one or more fine-tuned layers. Once again, the weights of the frozen layer(s) may have been learned by requesting that the other users wearing the other exosuits perform one or more particular types of movement (e.g., in a laboratory or controlled setting). Further, the weights in the fine-tuned layer(s) may be learned for the exosuit that includes the sensor(s) that collected the sensor data 605. With respect to this particular fine-tuning, a loss function that is used may be configured to reward accurate cluster assignments.

A cluster that is assigned may represent a type of movement (e.g., walking, standing, climbing up stairs, climbing down stairs, etc.). A cluster may further or alternatively represent one or more movement primitives that are predicted to be associated with a current movement type.

Figure 11:
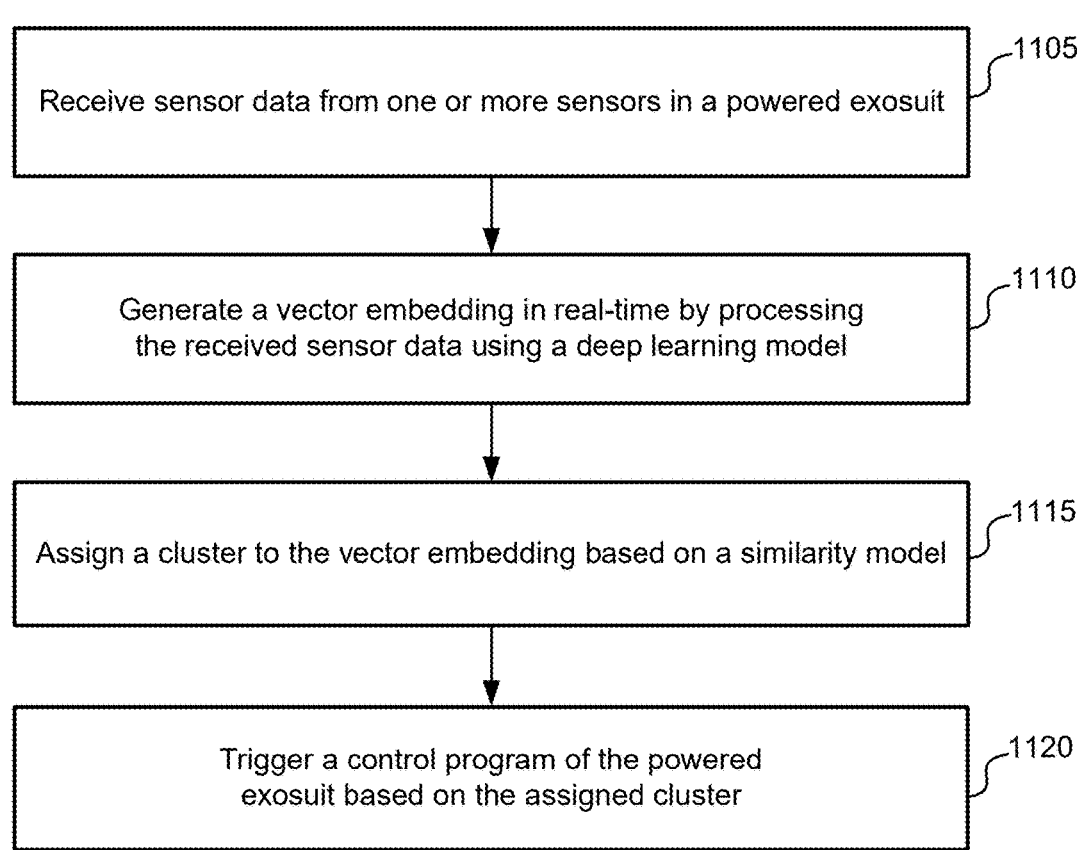
FIG. 11 shows an example flowchart to control a powered exosuit for providing assistance to the wearer.

FIG. 11 shows an example flowchart to control a powered exosuit for providing assistance to the wearer. The blocks in flowchart are illustrated in a specific order, while the order can be modified, for example, some blocks may be performed before other, and some blocks may be performed simultaneously. The blocks can be performed by hardware or software or a combination thereof. The process at block 1105 may include receiving sensor data from one or more sensors in the powered exosuit. The sensor data may represent the movement of the wearer of the powered exosuit. The movement can include structured activities, unstructured activities, or continuous motion.

A vector embedding may be generated in real-time by processing the received sensor data using a deep learning model, at block 1110. The deep learning model may be trained in an unsupervised manner using a dataset that includes past movements of one or more wearers of the powered exosuit. At block 1115, a cluster of a set of clusters may be assigned to the vector embedding based on a similarity model. The set of clusters can be defined by grouping vector embeddings of plurality of vector embeddings based on the similarity model. The plurality of vector embeddings may be generated by processing the dataset using the deep learning model. Each cluster of the set of clusters may represent a movement primitive.

A control program of the powered exosuit can be triggered based on the assigned cluster or the movement primitive, at block 1120. The control program can adjust dynamically at least torque or force of one or more actuators of the powered exosuit to provide assistance to the wearer. Moreover, each cluster may correspond to a different control program of the powered exosuit.

Figure 12:
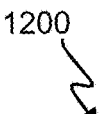
FIG. 12 shows an example flowchart to personalize the exosuit controller.
Figure 12:
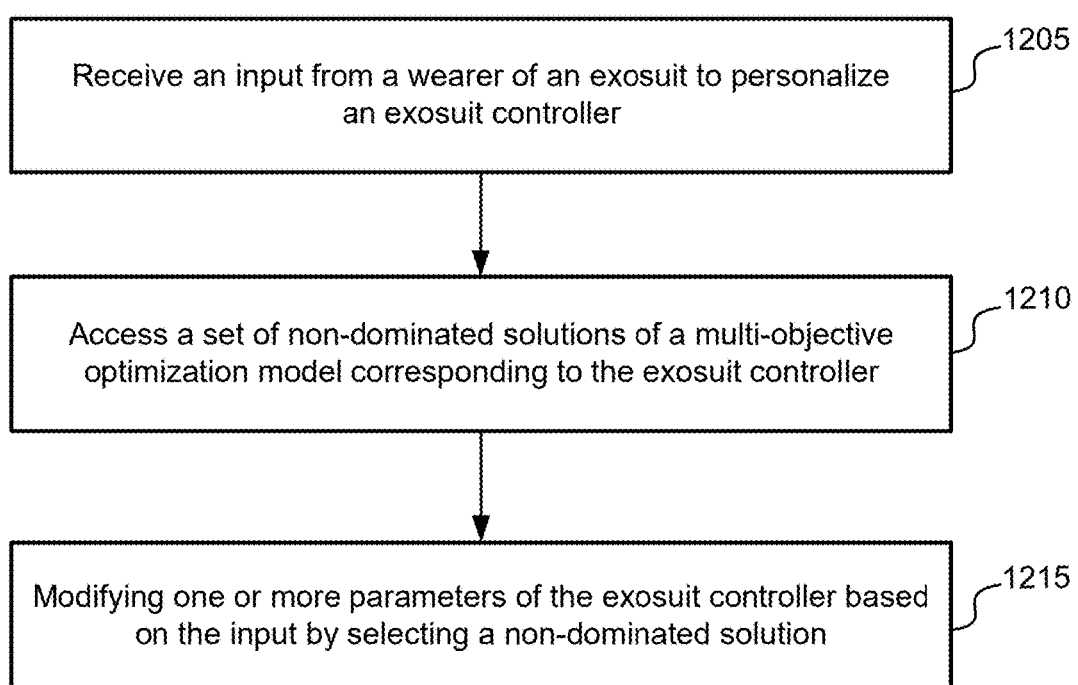

FIG. 12 shows an example flowchart to personalize the exosuit controller. The blocks in flowchart are illustrated in a specific order, while the order can be modified, for example, some blocks may be performed before other, and some blocks may be performed simultaneously. The blocks can be performed by hardware or software or a combination thereof. The process at block 1205 may include receiving sensor data from one or more sensors in the powered exosuit. The sensor data may represent the movement of the wearer of the powered exosuit. The movement can include structured activities, unstructured activities, or continuous motion.

A vector embedding may be generated in real-time by processing the received sensor data using a deep learning model, at block 1210. The deep learning model may be trained in an unsupervised manner using a dataset that includes past movements of one or more wearers of the powered exosuit. At block 1215, a cluster of a set of clusters may be assigned to the vector embedding based on a similarity model. The set of clusters can be defined by grouping vector embeddings of plurality of vector embeddings based on the similarity model. The plurality of vector embeddings may be generated by processing the dataset using the deep learning model. Each cluster of the set of clusters may represent a movement primitive.

Figure 13A:
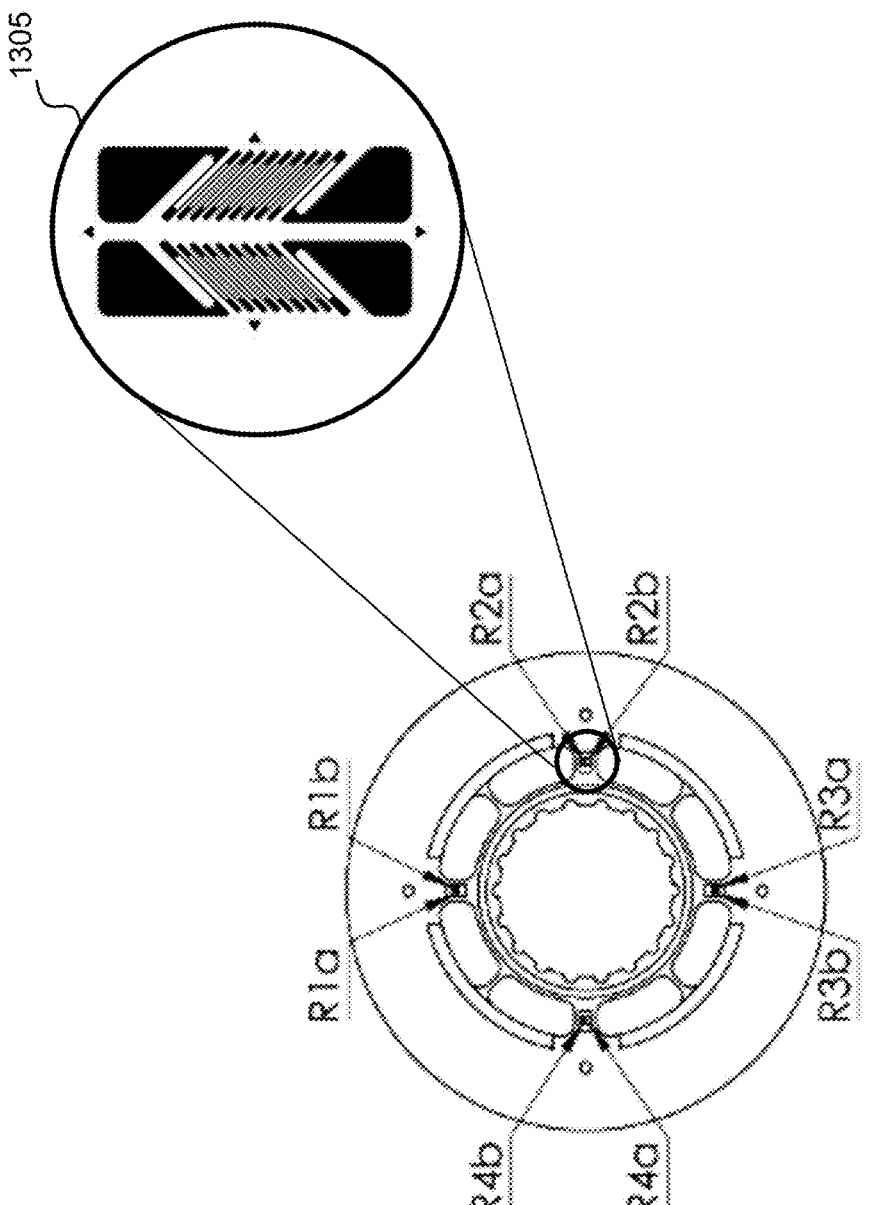
FIG. 13A shows placement of shear strain gauges in an exemplary implementation of the actuator of FIG. 3.

FIG. 13A shows placement of shear strain gauges 1305 in an exemplary implementation of the actuator of FIG. 3. A torque sensor may be implemented based on the shear strain gauges 1305. The torque sensor may comprise 4 dual-grid shear strain gauges that may be mounted at 4 different locations on the grounded side of the cycloid transmission as shown in FIG. 13A. The torque sensor may be placed into the grounded link of the actuator as opposed to the output link so that the strain gauge amplifier circuit board can be located on the ground along with the motor leads and the encoder PCB 305. This can simplify the wiring to the controller board. A strain gauge amplifier board may be located coaxially on the actuator ground with a wire that passes the signal to the motor controller PCB. To avoid excessive flex and length in the torque sensor cable, the controller may be located on the same structure as the actuator ground since they will be rotating together. The torque sensor may be susceptible to off axis loads (i.e., moments that are not pure torque around the joint axis). A common source of these moments can be a twisting of the exosuit around the leg during walking. The moments due to off axis loads may be mitigated based on the disclosed design of the flexure, placement, and selection of strain gauges. Additionally, a soft interface structure may transfer moments from the leg attachments less effectively and hence, the moments might not show up strongly at the joint.

Strain gauges working principle is to measure the change in electrical resistance across a thin conductive foil. Shear stress is a type of stress that acts parallel or tangential to the surface. The strain gauge may comprise a thin strip of material, such as a metal or a semiconductor, bonded to the surface where strain is to be measured. When torque is applied to an object, it induces shear stress on the surface of the object. This shear stress may cause the surface to deform, and the shear strain gauge can measure this deformation. By analyzing the change in resistance or capacitance of the strain gauge, the amount of shear strain and, consequently, the torque applied to the object can be determined.

An enlarged version (or zoomed-in version) of the shear strain gauge 1305 is also shown in FIG. 13A. The shear strain gauge 1305 is a dual-grid shear strain gauge. Traditional strain gauges typically comprise a single grid pattern of resistive material mounted onto a substrate. When the resistive material experiences strain, the resistance of the grid changes proportionally and the strain can be measured. In a dual-grid configuration, two separate grids may be placed perpendicular to each other on the same substrate. One grid may measure strain along the x-axis, while the other may measure the strain along the y-axis. For each of the dual-grid shear strain gauge 1505, two output terminals (e.g., R1$a$ and R1$b$) may correspond to the two separate grids. In the dual-grid configuration a simultaneous measurement of shear strain in both directions is possible. Moreover, by analyzing the changes in resistance in both grids, both magnitude and direction of shear strain in the material can be determined.

Figure 13B:
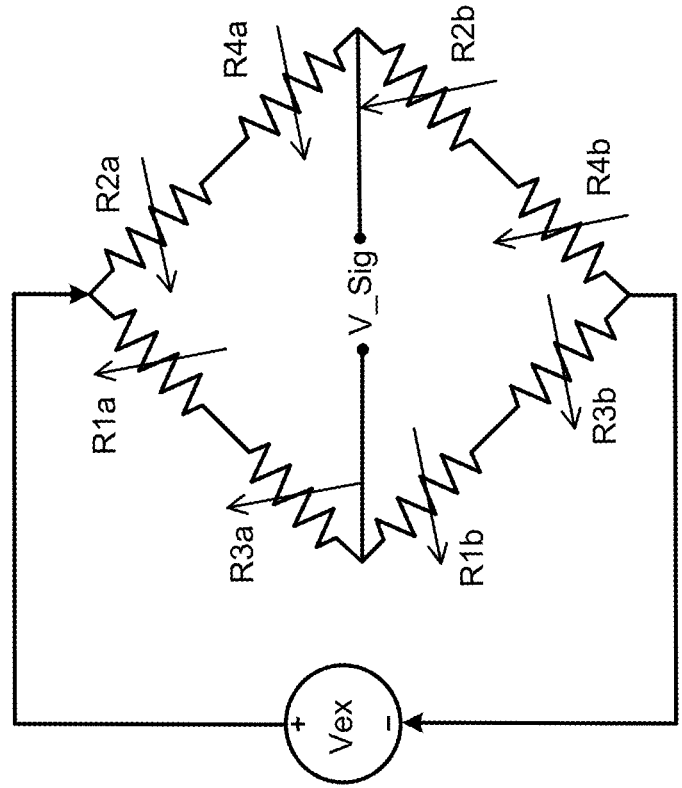
FIG. 13B shows connectivity of 4 dual-grid shear strain gauges of FIG. 13A in accordance with an exemplary implementation of the present disclosure.

FIG. 13B shows connectivity of 4 dual-grid shear strain gauges of FIG. 13A in accordance with an exemplary implementation of the present disclosure. The 4 dual-grid shear strain gauges may be connected in a bridge structure or a Wheatstone bridge configuration in the arrangement as shown in FIG. 13B. The disclosed arrangement may provide better sensitivity and accuracy for torque measurements while limiting the sensitivity to other loads.

The Wheatstone bridge is a circuit configuration that includes four resistive arms connected in a diamond shape and an excitation voltage can be applied across the diagonals. one or more of these resistive arms may include strain gauges. In the case of dual-grid shear strain gauges, each grid is connected to one arm of the Wheatstone bridge. Typically, one grid may be connected to one arm of the Wheatstone bridge to measure a shear strain along one axis, while the other grid may be connected to an adjacent arm to measure the shear strain along the perpendicular axis.

When shear strain is applied to a material, it may cause a change in resistance in attached strain gauges, leading to an imbalance in the Wheatstone bridge. This imbalance generates a differential voltage output across the bridge, which can be measured and correlated to the magnitude and direction of the shear strain. In some instances, a calibration process may be performed to establish the relationship between the output voltage and the applied shear strain. During the calibration process, known loads or strains may be applied to the material and corresponding output voltages may be recorded.

In some embodiments, the torque sensor comprises 4 dual-grid strain gauges which may yield 2 full H-bridges that can be read out as separate channels. The reading of the separate channels may be processed further using the PCB of the actuator or the two channels can be combined in the signal amplifier of the toque sensor. According to one exemplary implementation, the torque sensor was designed to read +/−40 Nm with an output signal of 0-5V. A higher resolution analog-to-digital converter (ADC) can be used for better resolution. For about 0.1 Nm of torque resolution, a 10-bit ADC may be used.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed:

1. A computer-implemented method to personalize an exosuit controller for a wearer, the method comprising:

receiving, by one or more computing devices, a first set of sensor data of one or more sensors in a powered exosuit, wherein the first set of sensor data captures a first movement of the wearer during a first time interval;

determining, by the one or more computing devices, a first set of features that represents the first movement of the wearer based on the first set of sensor data;

receiving, by the one or more computing devices, a second set of sensor data of the one or more sensors in the powered exosuit, wherein the second set of sensor data captures a second movement of the wearer during a second time interval;

determining, by the one or more computing devices, a second set of features that represents the second movement of the wearer based on the second set of sensor data;

detecting, by the one or more computing devices, a change in one or more features by comparing the first set of features with the second set of features; and adjusting, by the one or more computing devices, the exosuit controller based on a control program to vary a degree of assistance to the wearer by the powered exosuit upon detecting that the change in the one or more features exceed a threshold value, wherein the control program is selected based on a cluster associated with an embedding generated from the first set of sensor data and the second set of sensor data, the embedding representing biomechanical kinematic relationships among leg segment accelerations and angular velocities measured by the powered exosuit, and the cluster corresponding to a movement primitive of the wearer selected from a set of primitives representing exosuit-specific motion states including gait phase, terrain type, or fatigue condition, each primitive being associated with a control law that defines actuator torque and stiffness profiles for the powered exosuit.

2. The computer-implemented method of claim 1, wherein adjusting the exosuit controller further comprising:

accessing a set of non-dominated solutions of a multi-objective optimization model corresponding to the exosuit controller, wherein the set of non-dominated solutions represents a pareto front of the multi-objective optimization model; and modifying one or more parameters of the exosuit controller based on the degree of assistance, wherein the one or more parameters are modified by selecting a non-dominated solution of the set of non-dominated solutions representing the pareto front.

3. The computer-implemented method of claim 1, wherein an updated value of the degree of assistance is determined based on a magnitude and a sign of the change in the one or more features that exceed the threshold value.

4. The computer-implemented method of claim 1, wherein the first set of features and the second set of features includes at least one of: a gait speed, a stride height, a stride length, an estimated calories burnt, or an estimated fatigue.

5. The computer-implemented method of claim 1, wherein the first set of sensor data and the second set of sensor data includes at least one of: an acceleration of an upper leg, an acceleration of a lower leg, an angular velocity of the upper leg, or an angular velocity of the lower leg.

6. The computer-implemented method of claim 1, wherein the one or more sensors in the powered exosuit include a motion sensor, an accelerometer, and a gyroscope.

7. A non-transitory computer-readable storage medium having instructions stored thereon configured to cause one or more data processors to perform a set of actions comprising:

receiving a first set of sensor data of one or more sensors in a powered exosuit, wherein the first set of sensor data captures a first movement of a wearer during a first time interval;

determining a first set of features that represents the first movement of the wearer based on the first set of sensor data;

receiving a second set of sensor data of the one or more sensors in the powered exosuit, wherein the second set of sensor data captures a second movement of the wearer during a second time interval;

determining a second set of features that represents the second movement of the wearer based on the second set of sensor data;

detecting a change in one or more features by comparing the first set of features with the second set of features; and adjusting an exosuit controller based on a control program to vary a degree of assistance to the wearer by the powered exosuit upon detecting that the change in the one or more features exceed a threshold value, wherein the control program is selected based on a cluster associated with an embedding generated from the first set of sensor data and the second set of sensor data, the embedding representing biomechanical kinematic relationships among leg segment accelerations and angular velocities measured by the powered exosuit, and the cluster corresponding to a movement primitive of the wearer selected from a set of primitives representing exosuit-specific motion states including gait phase, terrain type, or fatigue condition, each primitive being associated with a control law that defines actuator torque and stiffness profiles for the powered exosuit.

8. The non-transitory computer-readable storage medium of claim 7 wherein the set of actions further includes:

accessing a set of non-dominated solutions of a multi-objective optimization model corresponding to the exosuit controller, wherein the set of non-dominated solutions represents a pareto front of the multi-objective optimization model; and modifying one or more parameters of the exosuit controller based on the degree of assistance, wherein the one or more parameters are modified by selecting a non-dominated solution of the set of non-dominated solutions representing the pareto front.

9. The non-transitory computer-readable storage medium of claim 7 wherein an updated value of the degree of assistance is determined based on a magnitude and a sign of the change in the one or more features that exceed the threshold value.

10. The non-transitory computer-readable storage medium of claim 7 wherein the first set of features and the second set of features includes at least one of: a gait speed, a stride height, a stride length, an estimated calories burnt, or an estimated fatigue.

11. The non-transitory computer-readable storage medium of claim 7 wherein the first set of sensor data and the second set of sensor data includes at least one of: an acceleration of an upper leg, an acceleration of a lower leg, an angular velocity of the upper leg, or an angular velocity of the lower leg.

12. The non-transitory computer-readable storage medium of claim 7 wherein the one or more sensors in the powered exosuit include a motion sensor, an accelerometer, and a gyroscope.

13. A system comprising:

one or more processors;

one or more non-transitory computer-readable media storing instructions, which, when executed by the system, cause the system to perform a set of actions comprising:

receiving a first set of sensor data of one or more sensors in a powered exosuit, wherein the first set of sensor data captures a first movement of a wearer during a first time interval;

determining a first set of features that represents the first movement of the wearer based on the first set of sensor data;

receiving a second set of sensor data of the one or more sensors in the powered exosuit, wherein the second set of sensor data captures a second movement of the wearer during a second time interval;

determining a second set of features that represents the second movement of the wearer based on the second set of sensor data;

detecting a change in one or more features by comparing the first set of features with the second set of features; and adjusting an exosuit controller based on a control program to vary a degree of assistance to the wearer by the powered exosuit upon detecting that the change in the one or more features exceed a threshold value, wherein the control program is selected based on a cluster associated with an embedding generated from the first set of sensor data and the second set of sensor data, the embedding representing biomechanical kinematic relationships among leg segment accelerations and angular velocities measured by the powered exosuit, and the cluster corresponding to a movement primitive of the wearer selected from a set of primitives representing exosuit-specific motion states including gait phase, terrain type, or fatigue condition, each primitive being associated with a control law that defines actuator torque and stiffness profiles for the powered exosuit.

14. The system of claim 13, wherein the set of actions further includes:

accessing a set of non-dominated solutions of a multi-objective optimization model corresponding to the exosuit controller, wherein the set of non-dominated solutions represents a pareto front of the multi-objective optimization model; and modifying one or more parameters of the exosuit controller based on the degree of assistance, wherein the one or more parameters are modified by selecting a non-dominated solution of the set of non-dominated solutions representing the pareto front.

15. The system of claim 13, wherein an updated value of the degree of assistance is determined based on a magnitude and a sign of the change in the one or more features that exceed the threshold value.

16. The system of claim 13, wherein the first set of features and the second set of features includes at least one of: a gait speed, a stride height, a stride length, an estimated calories burnt, or an estimated fatigue.

17. The system of claim 13, wherein the first set of sensor data and the second set of sensor data includes at least one of: an acceleration of an upper leg, an acceleration of a lower leg, an angular velocity of the upper leg, or an angular velocity of the lower leg.

18. The system of claim 13, wherein the one or more sensors in the powered exosuit include a motion sensor, an accelerometer, and a gyroscope.

* * * * *